(12) United States Patent
Nurishi

(10) Patent No.: US 8,149,518 B2
(45) Date of Patent: Apr. 3, 2012

(54) ZOOM LENS SYSTEM AND IMAGE PICKUP APPARATUS INCLUDING THE SAME

(75) Inventor: Ryuji Nurishi, Utsunomiya (JP)

(73) Assignee: Canon Kabushiki Kaisha (JP)

(*) Notice: Subject to any disclaimer, the term of this patent is extended or adjusted under 35 U.S.C. 154(b) by 74 days.

(21) Appl. No.: 12/856,988

(22) Filed: Aug. 16, 2010

(65) Prior Publication Data

US 2011/0038055 A1 Feb. 17, 2011

(30) Foreign Application Priority Data

Aug. 17, 2009 (JP) ................... 2009-188461

(51) Int. Cl.
*G02B 15/14* (2006.01)

(52) U.S. Cl. .......................................... 359/687

(58) Field of Classification Search .................. 359/676, 359/683, 687
See application file for complete search history.

(56) References Cited

U.S. PATENT DOCUMENTS

| 6,940,656 B2 | 9/2005 | Oomura et al. |
| 7,505,213 B2 | 3/2009 | Tsutsumi et al. |
| 2009/0296231 A1* | 12/2009 | Shirasuna ..................... 359/687 |

FOREIGN PATENT DOCUMENTS

JP 2004-264459 A 9/2004

* cited by examiner

*Primary Examiner* — Scott J Sugarman
(74) *Attorney, Agent, or Firm* — Rossi, Kimms & McDowell LLP

(57) ABSTRACT

A zoom lens system, includes, in order from an object side to an image side: a positive first lens unit which does not move for zooming; a negative second lens unit which moves for zooming; a positive third lens unit which moves for zooming; and a fourth lens unit which does not move for zooming, is provided for imaging, and has a positive refractive power, in which the third lens unit includes multiple lenses including a positive lens and a negative lens, and the third lens unit satisfies: $-2.0 \times 10^{-3} < (\theta pa - \theta na)/(\nu pa - \nu na) < -1.4 \times 10^{-3}$; and $41 < \nu pa - \nu na < 53$; and $2.9 < SGa3 < 3.2$, where $\nu na$ and $\theta na$ indicate averages of Abbe number and partial dispersion ratio respectively, of the negative lenses, $\nu pa$ and $\theta pa$ indicate an average Abbe number of the positive lenses of the positive lenses included therein, respectively, and $SGa3$ indicates an average specific gravity of the lenses.

15 Claims, 17 Drawing Sheets

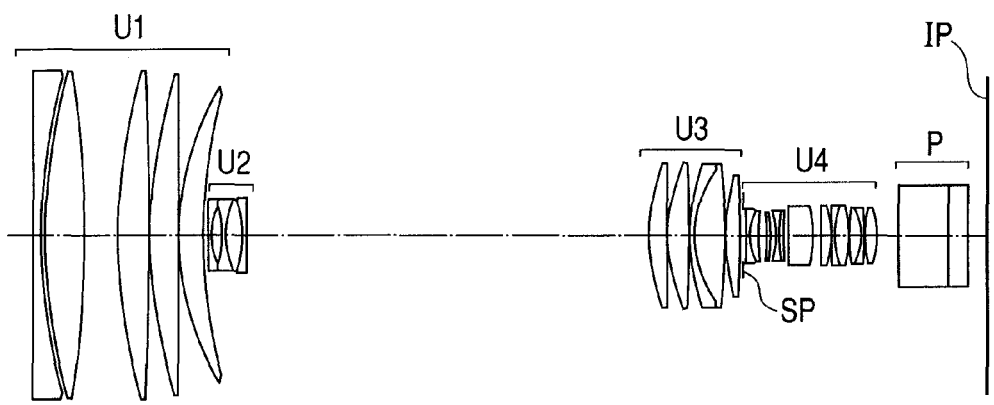
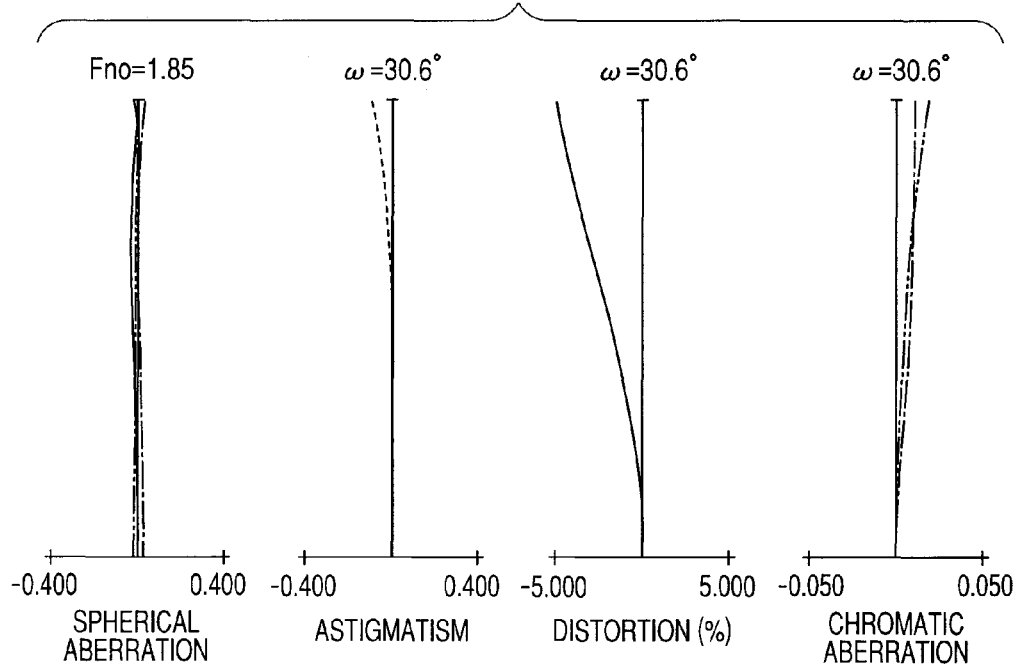

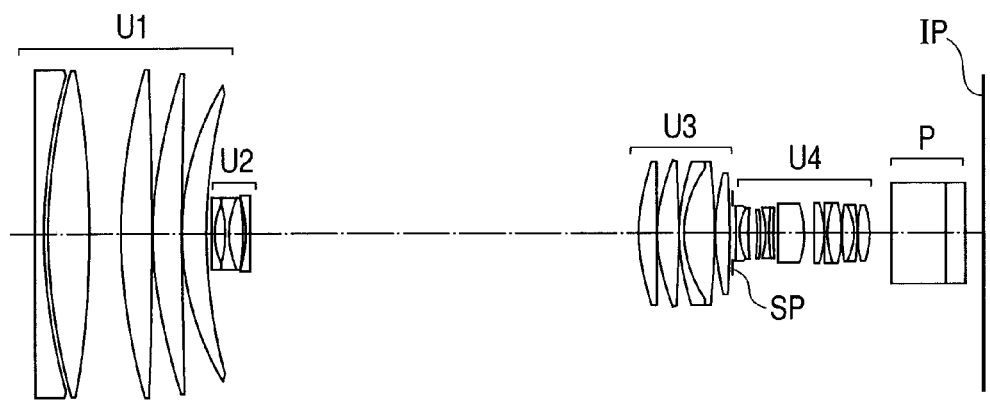
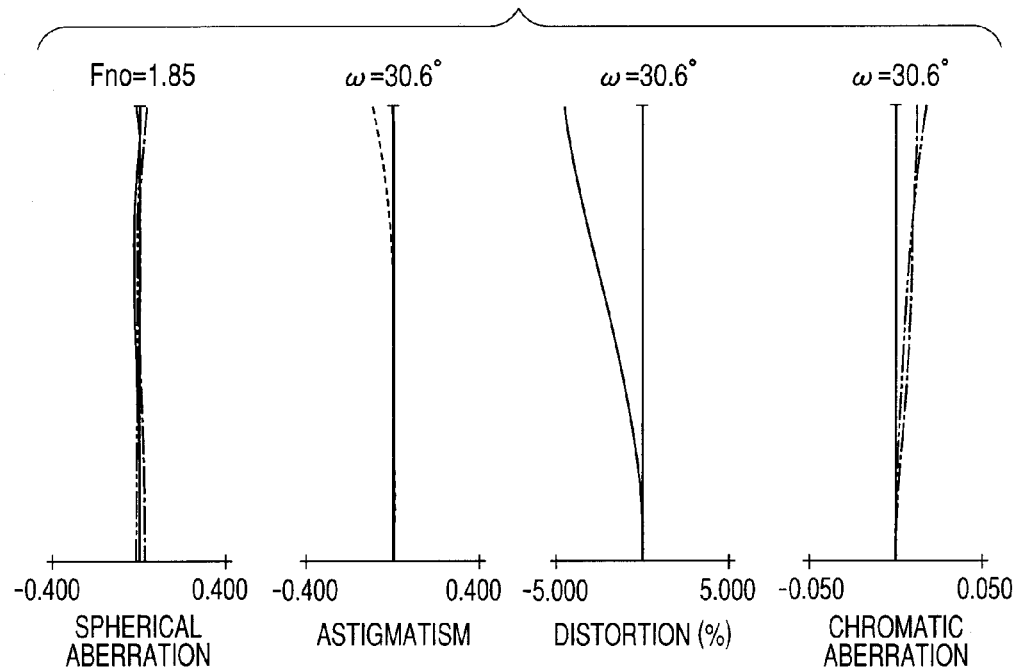

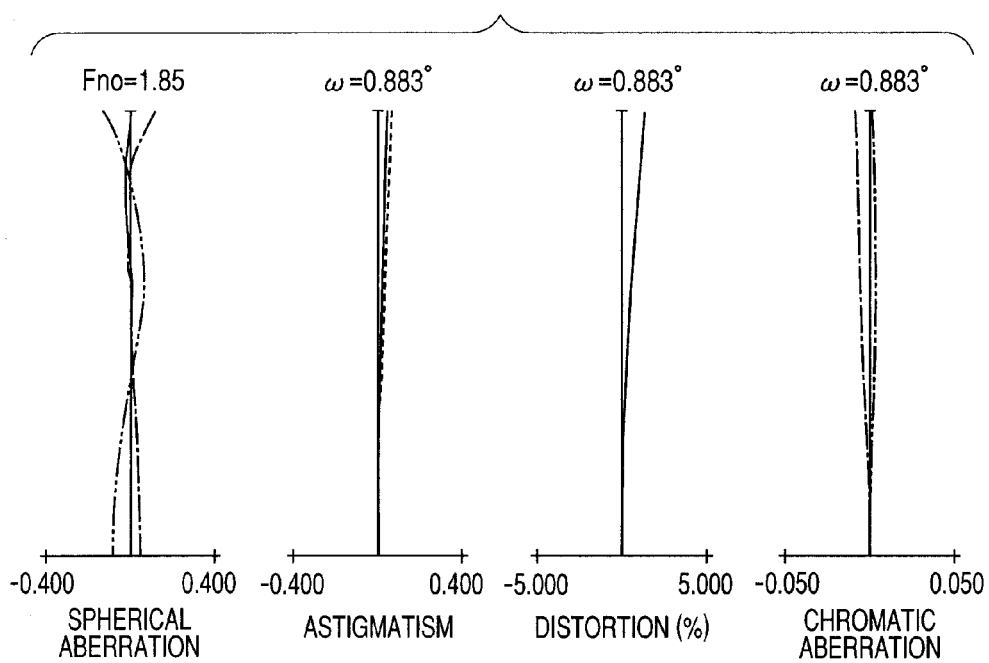
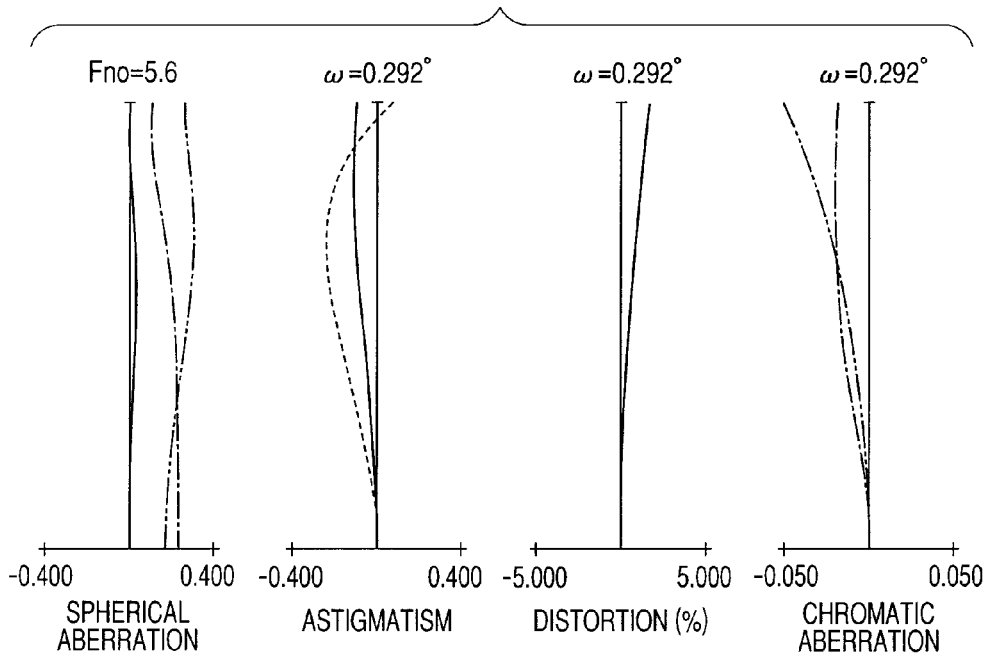

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the same, and more particularly, to a zoom lens system suited for use in a camera for broadcast, a video camera, a digital camera, and a film camera.

2. Description of the Related Art

In recent years, a zoom lens system with a large aperture ratio, a high zoom ratio, and a high optical performance is desired for use in an image pickup apparatus, such as a television camera, a film camera, a digital camera, or a video camera. A positive lead type four-unit zoom lens system has been known as the zoom lens system with a large aperture ratio and a high zoom ratio. In the four-unit zoom lens system, four lens units are provided in total, and one of the lens units located closest to an object side has a positive refractive power. The four-unit zoom lens system includes a first lens unit for focusing, a second lens unit having a negative refractive power for variation of magnification, a third lens unit having a positive refractive power for correcting shift of an image plane due to the variation of magnification, and a fourth lens unit having a positive refractive power for imaging, which are arranged in the stated order from the object side to the image side. As an example of this type of four-unit zoom lens system, four-unit zoom lens systems having a high zoom ratio are known (see U.S. Pat. No. 6,940,656, Japanese Patent Application Laid-Open No. 2004-264459, and U.S. Pat. No. 7,505,213). In U.S. Pat. No. 6,940,656 and Japanese Patent Application Laid-Open No. 2004-264459, a zoom lens system with a high zoom ratio of about 96 is disclosed. In U.S. Pat. No. 7,505,213, a zoom lens system having a high zoom ratio of about 50 is disclosed.

The above-mentioned positive lead type four-unit zoom lens system may support a large aperture ratio and a high zoom ratio relatively easily. However, if the zoom ratio becomes as high as about 100, a large amount of variation of various aberrations may occur, leading to difficulties in achieving a high optical performance over the entire zoom range. In particular, a large amount of lateral chromatic aberration and longitudinal chromatic aberration may occur at the zoom position close to the telephoto end. Therefore, it is important to effectively correct chromatic aberrations in a secondary spectrum as well as those in the primary spectrum to form a high quality image. In the positive-lead type four-unit zoom lens system, in order to achieve a high zoom ratio, to effectively correct chromatic aberrations, and to achieve a high optical performance, it is important to appropriately set the configuration of lenses of the third lens unit for correcting a shift of an image plane due to the variation of magnification. If the lens configuration of the third lens unit is not appropriately set, a large amount of variation of aberrations, such as chromatic aberration, spherical aberration, halo, coma, and color difference of spherical aberration, may occur during zooming, which results in difficulty in achieving both a high zoom ratio and a high optical performance at the same time. In particular, in a case where the zoom ratio is increased to as high as about 100, longitudinal chromatic aberration may increase at the telephoto end, and further residual aberration in the secondary spectrum may be increased in amount, which may be difficult to be corrected appropriately.

SUMMARY OF THE INVENTION

According to one aspect of the present invention, a zoom lens system includes, in order of from an object side to an image side: a first lens unit which does not move for zooming and has a positive refractive power; a second lens unit which moves for zooming and has a negative refractive power; a third lens unit which moves for zooming and has a positive refractive power; and a fourth lens unit which does not move for zooming, is provided for imaging, and has a positive refractive power, in which: the third lens unit includes multiple lenses including a positive lens and a negative lens; and the following conditions are satisfied:

$$-2.0\times10^{-3}<(\theta pa-\theta na)/(\nu pa-\nu na)<-1.4\times10^{-3};$$

$$41<\nu pa-\nu na<53;\text{ and}$$

$$2.9<SGa3<3.2,$$

where $\nu na$ and $\theta na$ indicate an average of Abbe numbers and an average of partial dispersion ratios, respectively, of materials of the negative lenses included in the third lens unit in case where the third lens unit includes a plurality of negative lenses or an Abbe number and a partial dispersion ratio, respectively, of a material of the negative lens included in the third lens unit in case where the third lens unit includes one negative lens, $\nu pa$ and $\theta pa$ indicate an average Abbe number and an average partial dispersion ratio, respectively, of a material of the positive lens included in the third lens unit in case where the third lens unit includes a plurality of positive lenses or an Abbe number and a partial dispersion ratio, respectively, of a material of the positive lens included in the third lens unit in case where the third lens unit includes one positive lens, and SGa3 indicates an average specific gravity of the multiple lenses included in the third lens unit.

According to another aspect of the invention, an image pickup apparatus includes: a zoom lens system; and a solid state image pickup element for receiving an image formed by the zoom lens system, in which the zoom lens system including, in order of from an object side to an image side: a first lens unit which does not move for zooming and has a positive refractive power; a second lens unit which moves for zooming and has a negative refractive power; a third lens unit which moves for zooming and has a positive refractive power; and a fourth lens unit which does not move for zooming, is provided for imaging, and has a positive refractive power, in which: the third lens unit includes a positive lens and a negative lens; and the following conditions are satisfied:

$$-2.0\times10^{-3}<(\theta pa-\theta na)/(\nu pa-\nu na)<-1.4\times10^{-3};$$

$$41<\nu pa-\nu na<53;\text{ and}$$

$$2.9<SGa3<3.2,$$

where $\nu na$ and $\theta na$ indicate an average of Abbe numbers and an average of partial dispersion ratios, respectively, of materials of the negative lenses included in the third lens unit in case where the third lens unit includes a plurality of negative lenses or an Abbe number and a partial dispersion ratio, respectively, of a material of the negative lens included in the third lens unit in case where the third lens unit includes one negative lens, $\nu pa$ and $\theta pa$ indicate an average of Abbe numbers and an average of partial dispersion ratios, respectively, of materials of the positive lenses included in the third lens unit in case where the third lens unit includes a plurality of positive lenses or an Abbe number and a partial dispersion ratio, respectively, of a material of the positive lens included in the third lens unit in case where the third lens unit includes one positive lens, and SGa3 indicates an average specific gravity of the multiple lenses included in the third lens unit.

Further features of the present invention will become apparent from the following description of exemplary embodiments with reference to the attached drawings.

BRIEF DESCRIPTION OF THE DRAWINGS

FIG. 1 is a cross sectional view of a zoom lens system according to Numerical Embodiment 1, at a wide angle end.

FIG. 2A is an aberration graph at the wide angle end of the zoom lens system according to Numerical Embodiment 1.

FIG. 3 is a cross sectional view of a zoom lens system according to Numerical Embodiment 2, at a wide angle end.

FIG. 4A is an aberration graph at the wide angle end of the zoom lens system according to Numerical Embodiment 2.

FIG. 8B is an aberration graph at an intermediate zoom position of the zoom lens system according to Numerical Embodiment 4.

FIG. 8C is an aberration graph at a telephoto end of the zoom lens system according to Numerical Embodiment 4.

DESCRIPTION OF THE EMBODIMENT

An object of the present invention is to provide a zoom lens system with a high zoom ratio and capable of effectively reducing and correcting chromatic aberration in the entire zoom range from the wide angle end to the telephoto end. More specifically, an object of the present invention is to provide a zoom lens system having a high optical performance in the entire zoom range, and an image pickup apparatus including the zoom lens system.

Hereinafter, an embodiment of the present invention is described in detail with reference to the attached drawings. The zoom lens system according to the present invention includes a first lens unit (focus lens unit) which does not move for zooming and has a positive refractive power and a second lens unit (variator) which moves for zooming and has negative refractive power. The first lens unit and the second lens unit are arranged in the stated order from an object side to an image side. The zoom lens system further includes a third lens unit (compensator) which moves on an optical axis in conjunction with the movement of the second lens unit and has positive refractive power for correcting shift of an image plane due to the variation of magnification, and a fourth lens unit (relay lens unit) which does not move for zooming and has positive refractive power for imaging. Further, the third lens unit includes a positive lens and a negative lens.

Figure 2B:
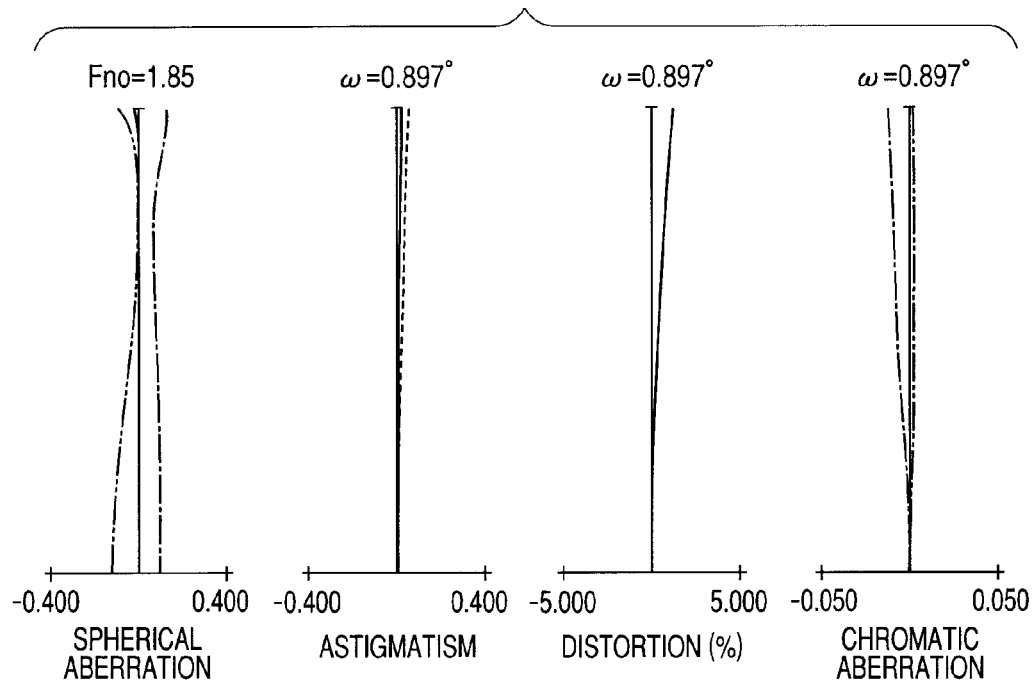
FIG. 2B is an aberration graph at an intermediate zoom position of the zoom lens system according to Numerical Embodiment 1.
Figure 2C:
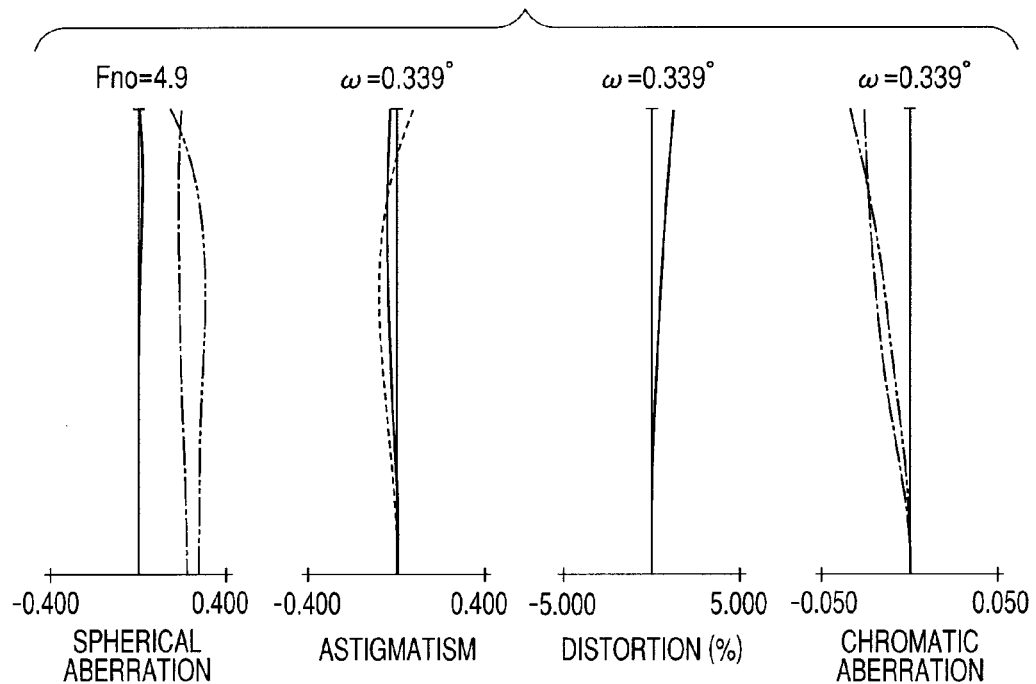
FIG. 2C is an aberration graph at a telephoto end of the zoom lens system according to Numerical Embodiment 1.
Figure 4B:
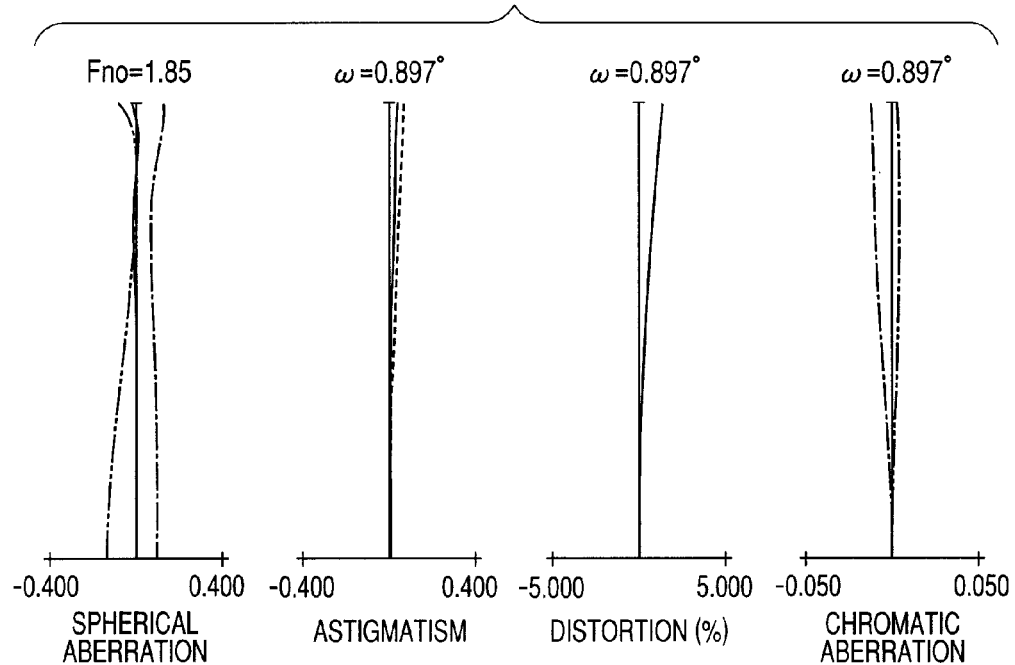
FIG. 4B is an aberration graph at an intermediate zoom position of the zoom lens system according to Numerical Embodiment 2.
Figure 4C:
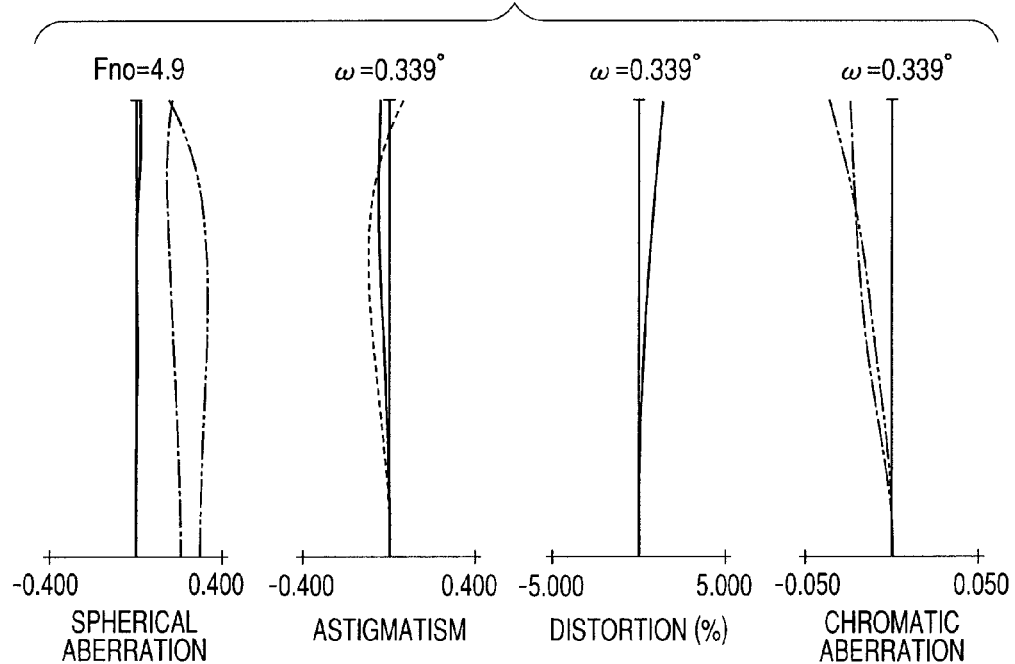
FIG. 4C is an aberration graph at a telephoto end of the zoom lens system according to Numerical Embodiment 2.
Figure 5:
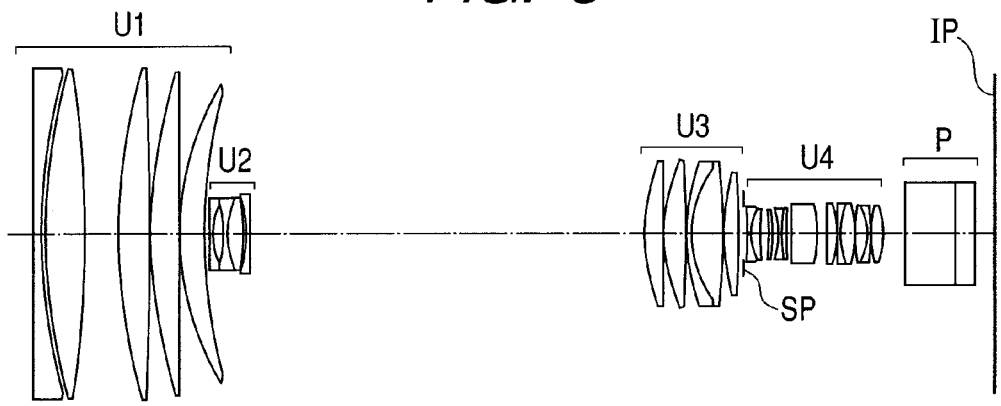
FIG. 5 is a cross sectional view of a zoom lens system according to Numerical Embodiment 3, at a wide angle end.
Figure 6A:
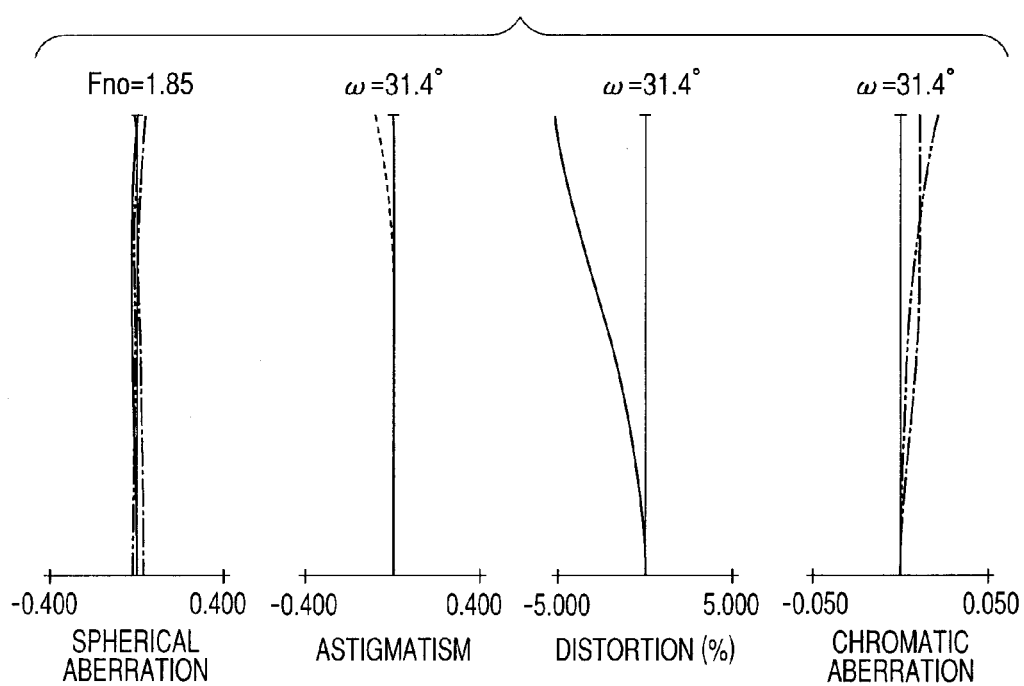
FIG. 6A is an aberration graph at the wide angle end of the zoom lens system according to Numerical Embodiment 3.
Figure 6B:
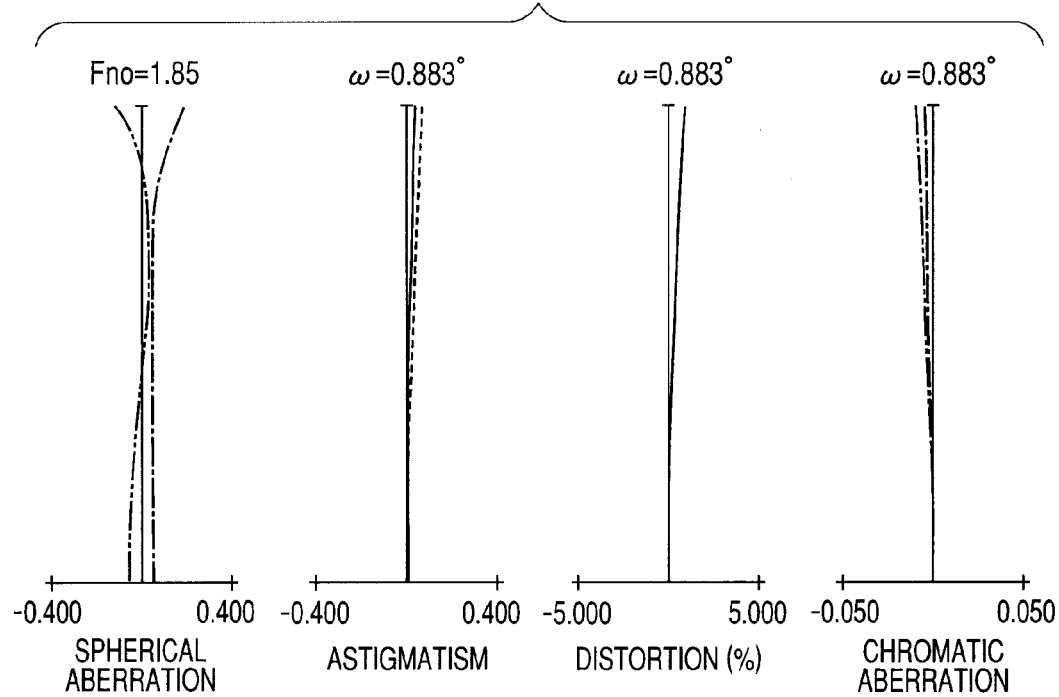
FIG. 6B is an aberration graph at an intermediate zoom position of the zoom lens system according to Numerical Embodiment 3.
Figure 6C:
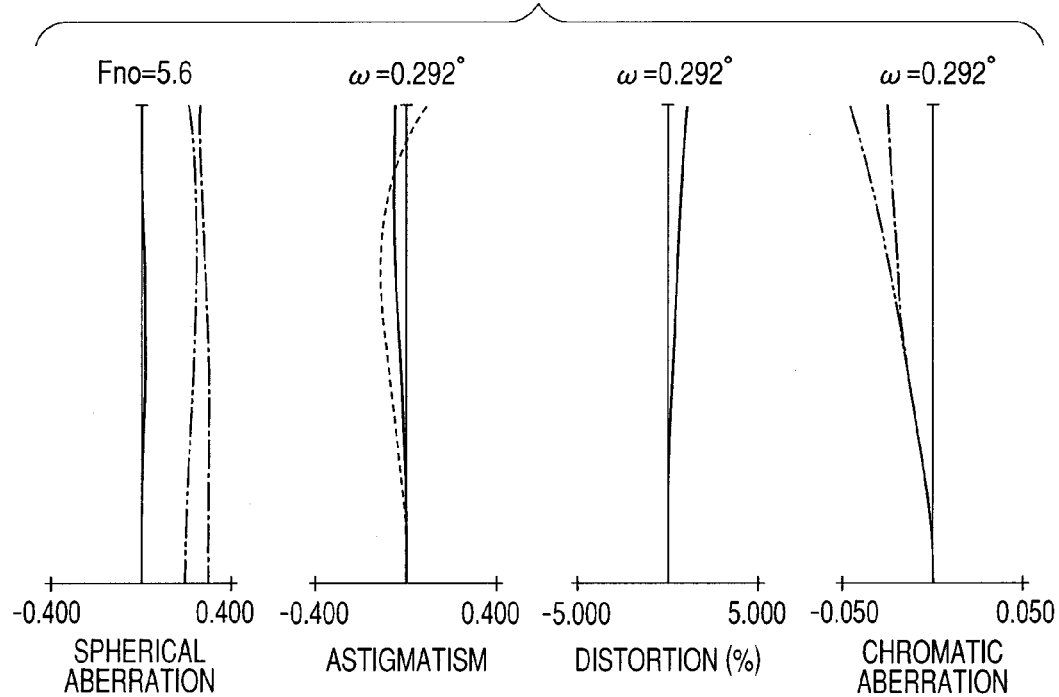
FIG. 6C is an aberration graph at a telephoto end of the zoom lens system according to Numerical Embodiment 3.
Figure 7:
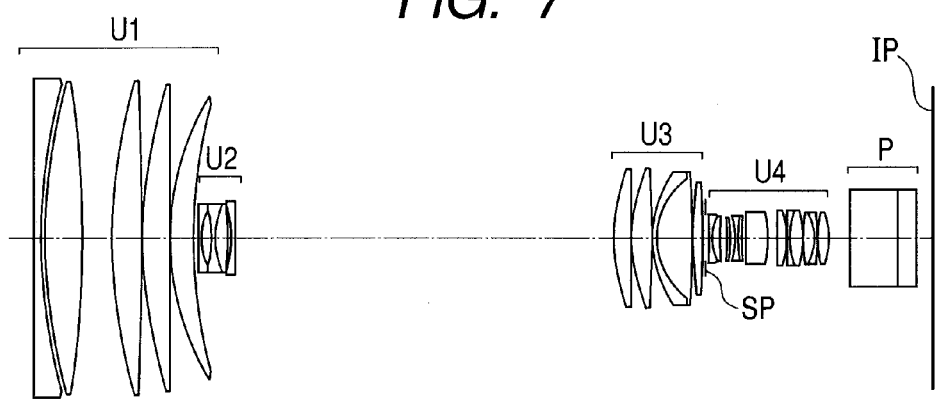
FIG. 7 is a cross sectional view of a zoom lens system according to Numerical Embodiment 4, at a wide angle end.
Figure 8A:
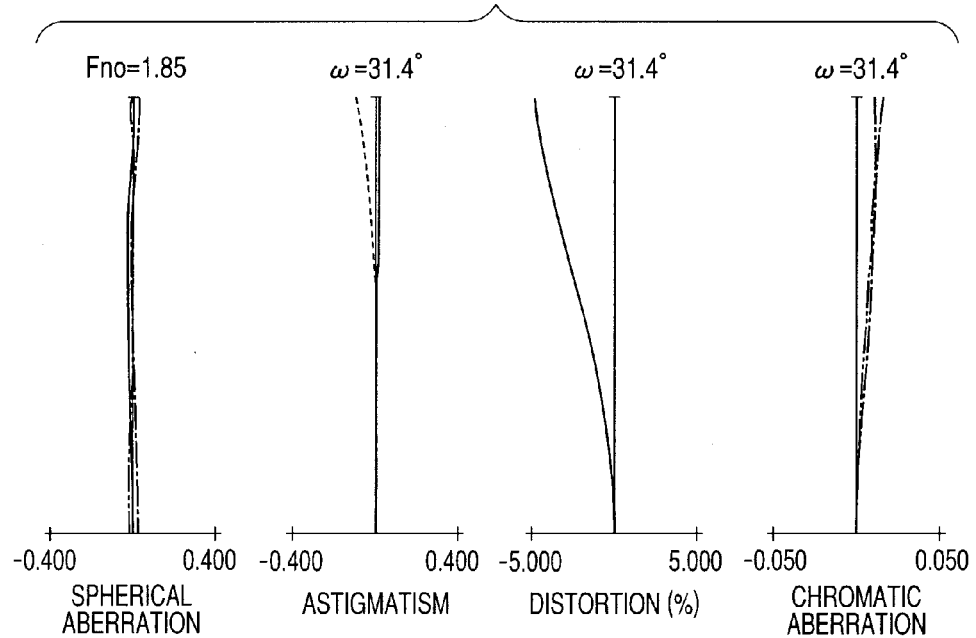
FIG. 8A is an aberration graph at the wide angle end of the zoom lens system according to Numerical Embodiment 4.
Figure 9:
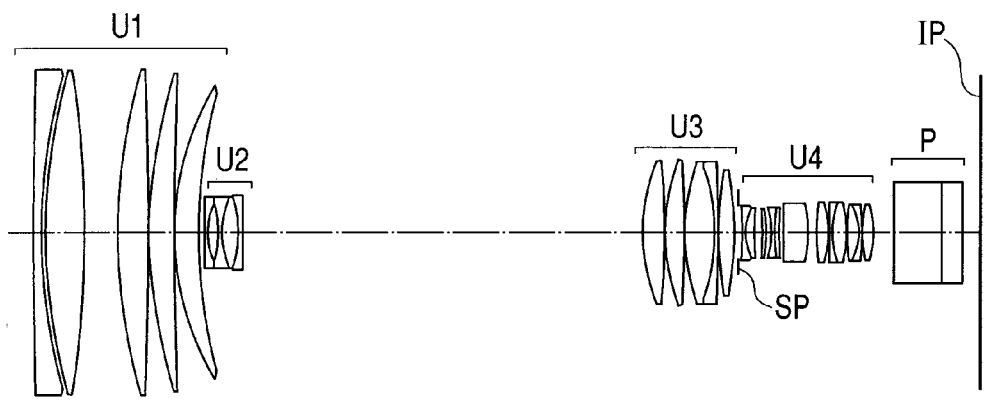
FIG. 9 is a cross sectional view of a zoom lens system according to Numerical Embodiment 5, at a wide angle end.
Figure 10A:
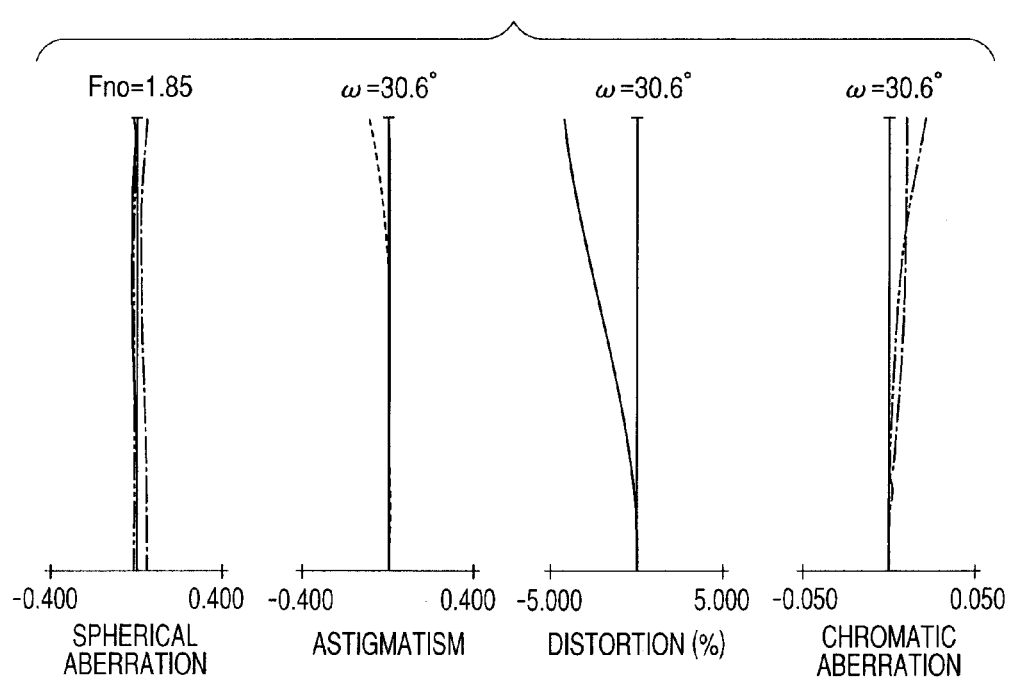
FIG. 10A is an aberration graph of the zoom lens system according to Numerical Embodiment 5.
Figure 10B:
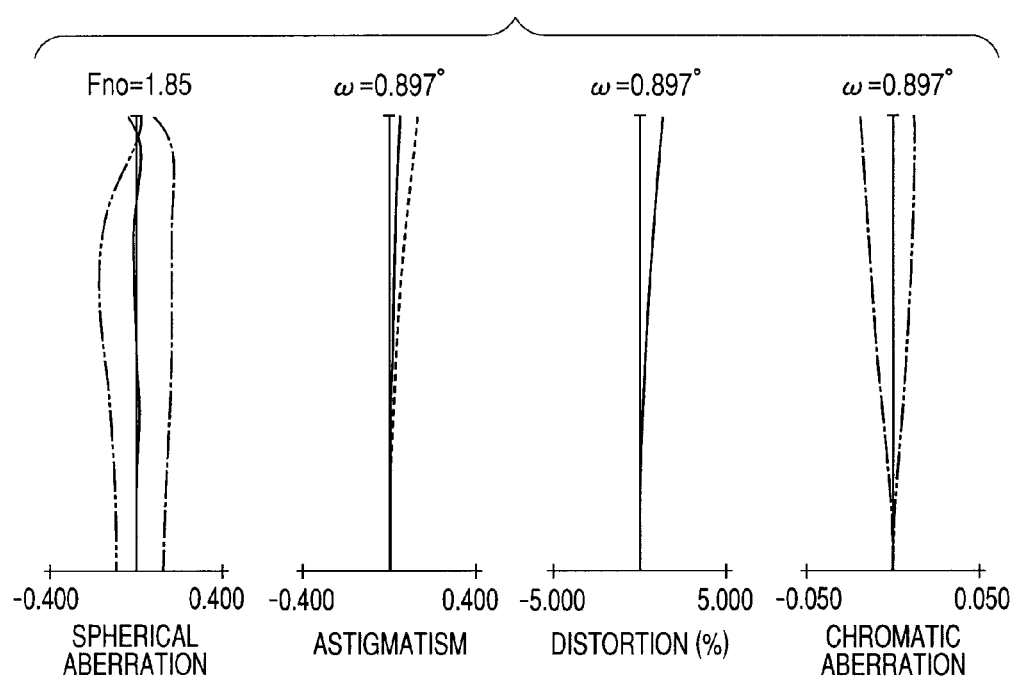
FIG. 10B is an aberration graph at an intermediate zoom position of the zoom lens system according to Numerical Embodiment 5.
Figure 10C:
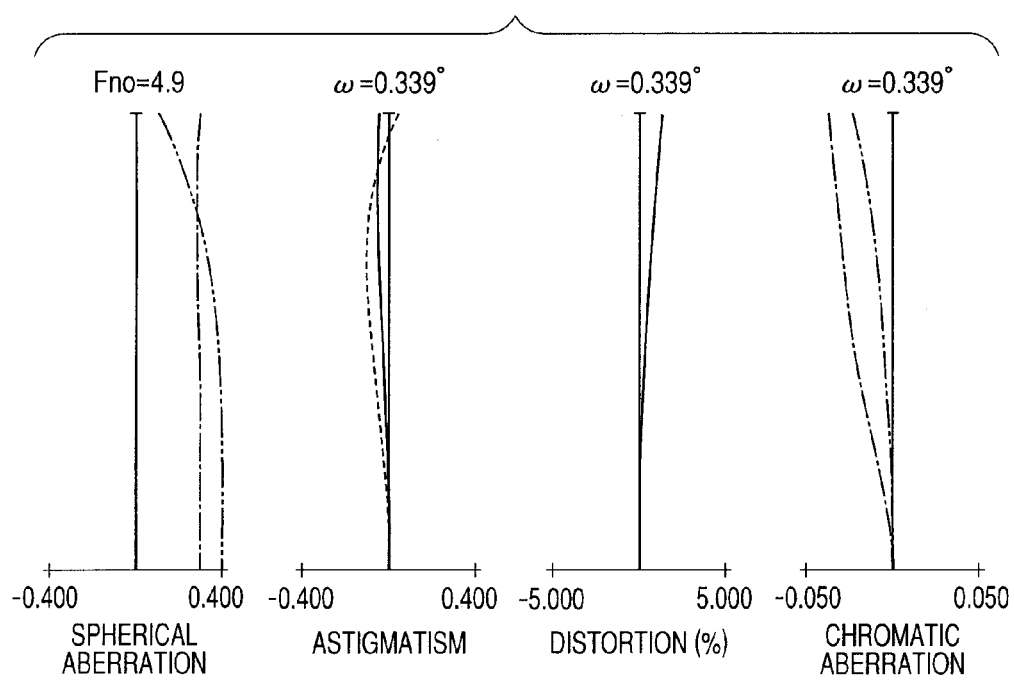
FIG. 10C is an aberration graph at a telephoto end of the zoom lens system according to Numerical Embodiment 5.
Figure 11:
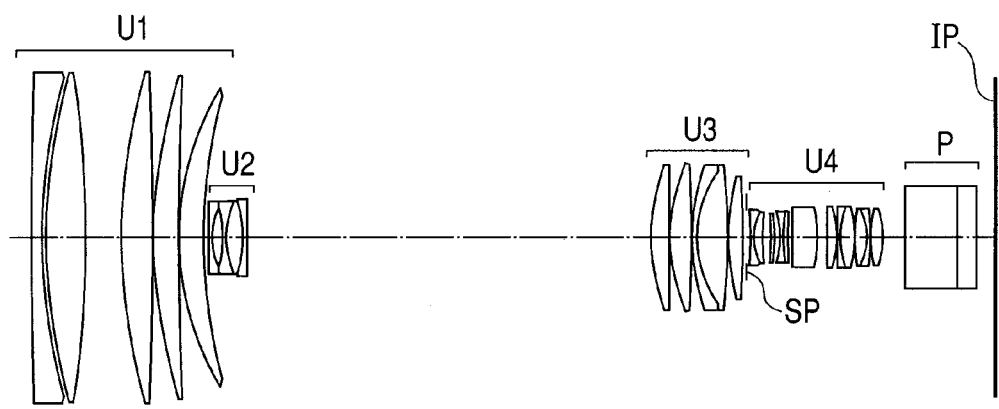
FIG. 11 is a cross sectional view of a zoom lens system according to Numerical Embodiment 6, at a wide angle end.
Figure 12A:
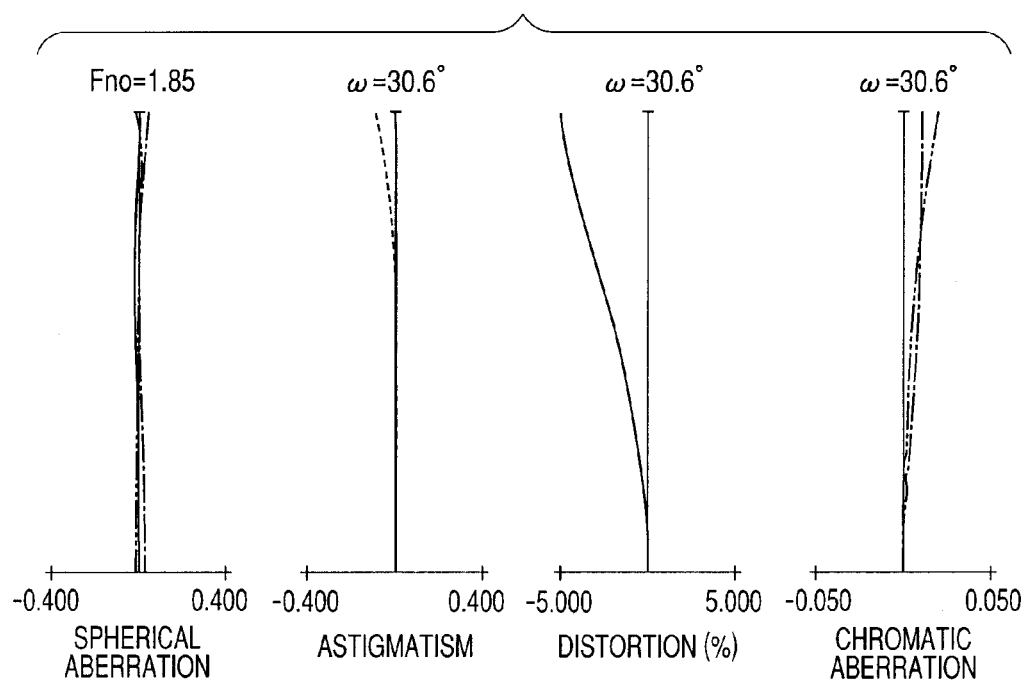
FIG. 12A is an aberration graph at the wide angle end of the zoom lens system according to Numerical Embodiment 6.
Figure 12B:
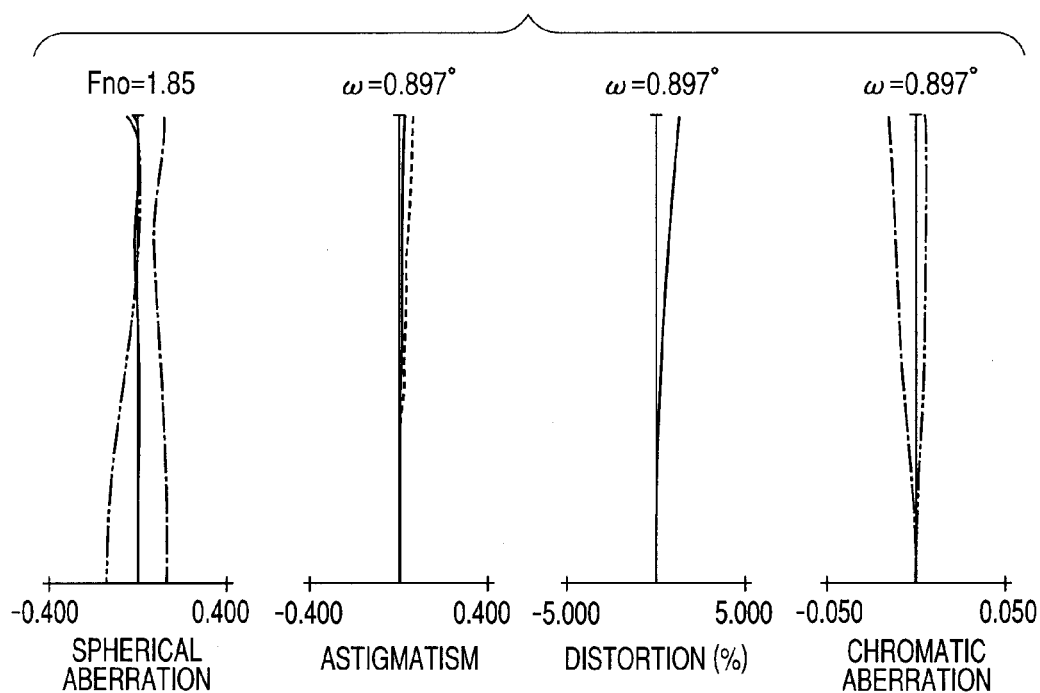
FIG. 12B is an aberration graph at an intermediate zoom position of the zoom lens system according to Numerical Embodiment 6.
Figure 12C:
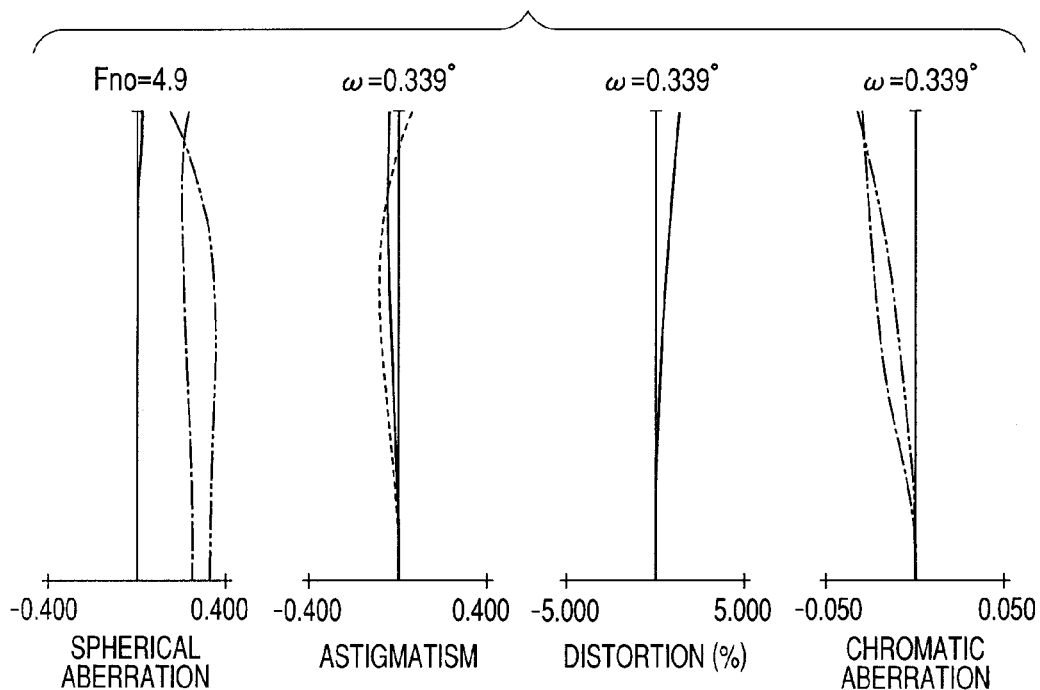
FIG. 12C is an aberration graph at a telephoto end of the zoom lens system according to Numerical Embodiment 6.
Figure 13:
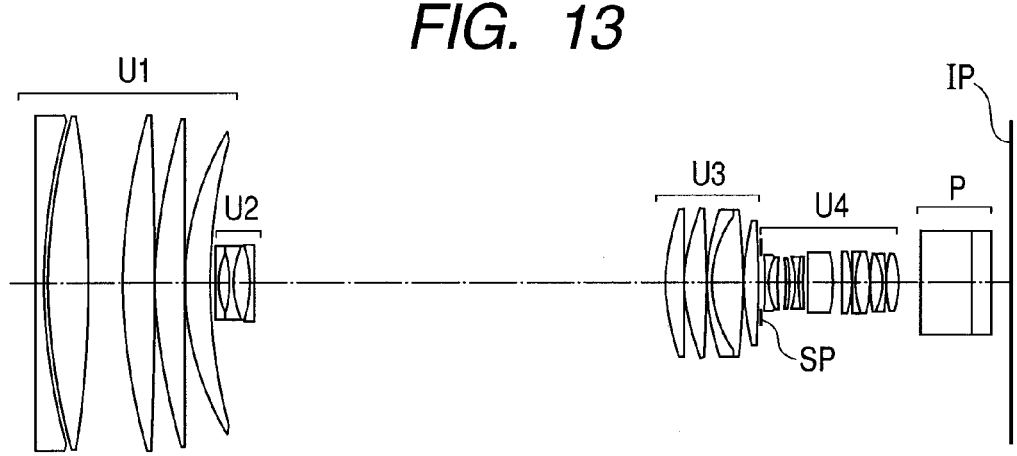
FIG. 13 is a cross sectional view of a zoom lens system according to Numerical Embodiment 7, at a wide angle end.
Figure 14A:
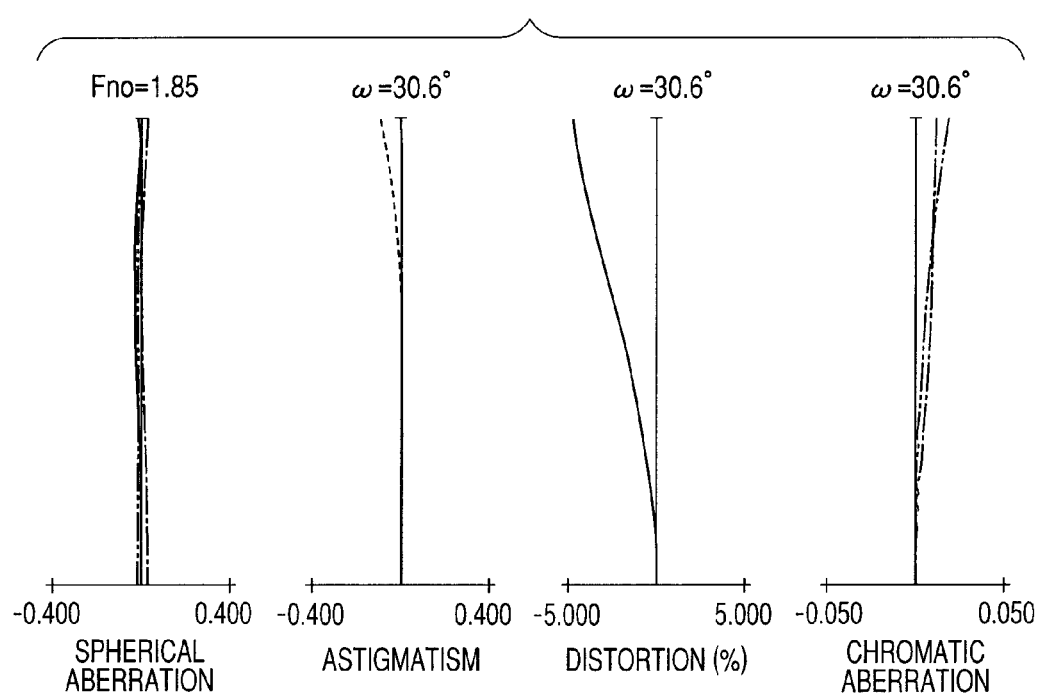
FIG. 14A is an aberration graph at the wide angle end of the zoom lens system according to Numerical Embodiment 7.
Figure 14B:
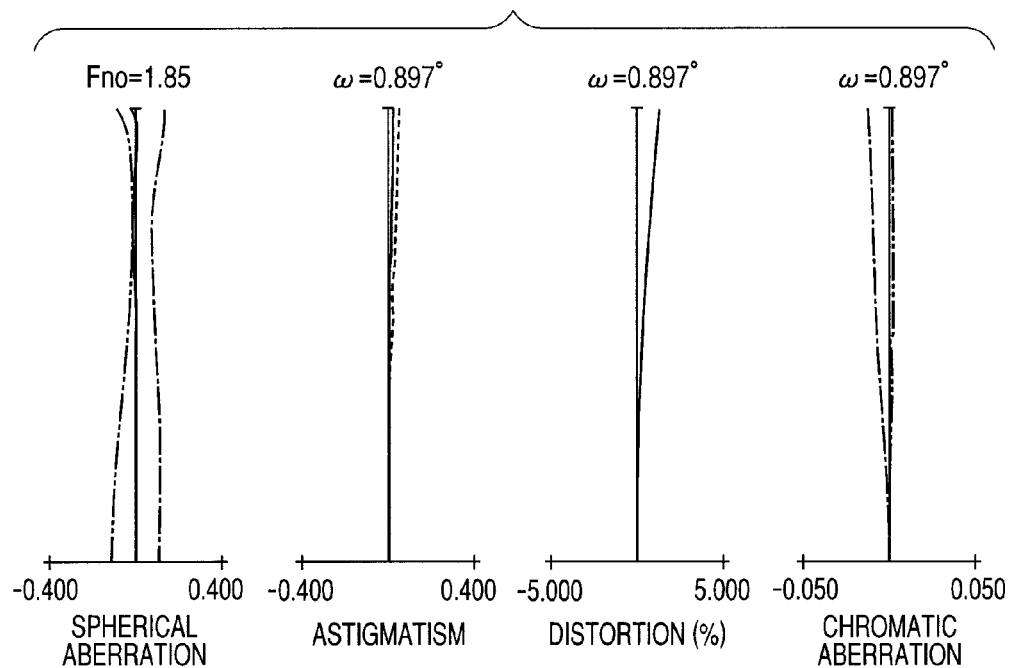
FIG. 14B is an aberration graph at an intermediate zoom position of the zoom lens system according to Numerical Embodiment 7.
Figure 14C:
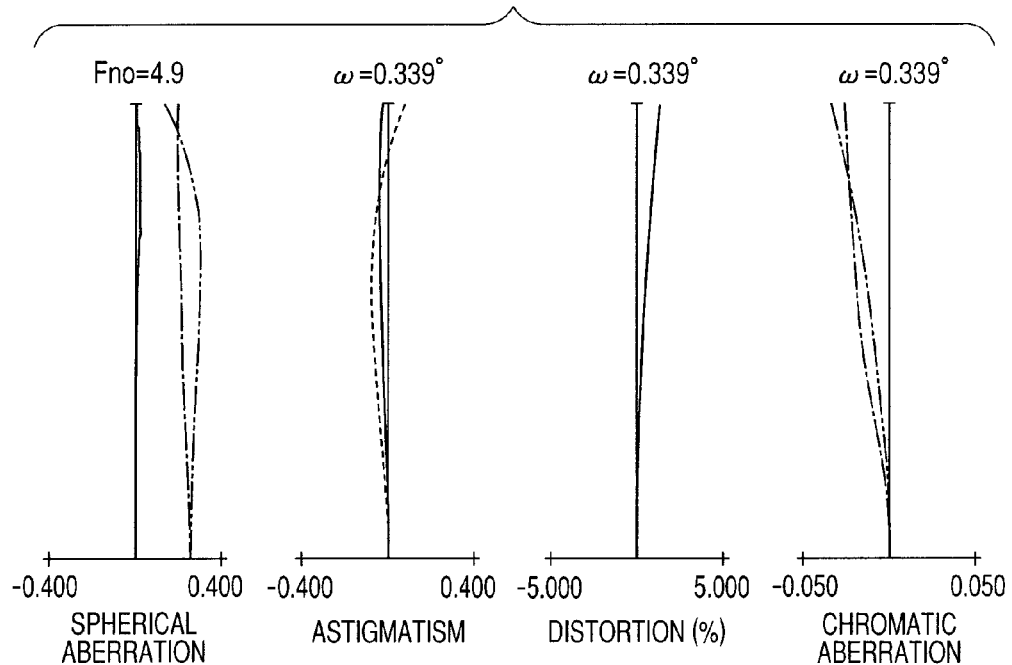
FIG. 14C is an aberration graph at a telephoto end of the zoom lens system according to Numerical Embodiment 7.

FIG. 1 is a cross sectional view of a zoom lens system according to Embodiment 1 (Numerical Embodiment 1) of the present invention at the wide angle end during focusing on an infinitely-distant object. FIGS. 2A, 2B, and 2C are longitudinal aberration diagrams of Embodiment 1 (Numerical Embodiment 1) at the wide angle end, at an intermediate zoom position (at the focal length of 351 mm), and at a telephoto end, respectively. Note that, the focal length is a value of the corresponding numerical embodiments described later expressed in the unit of mm. The same is true for each of the following embodiments. FIG. 3 is a cross sectional view of a zoom lens system according to Embodiment 2 (Numerical Embodiment 2) of the present invention at the wide angle end in the focus state during focusing on an infinitely-distant object. FIGS. 4A, 4B, and 4C are longitudinal aberration diagrams of Numerical Embodiment 3 at the wide angle end, at the intermediate zoom position (at the focal length of 351 mm), and at the telephoto end, respectively. FIG. 5 is a cross sectional view of a zoom lens system according to Embodiment 3 (Numerical Embodiment 3) of the present invention at the wide angle end in the focus state during focusing on an infinitely-distant object. FIGS. 6A, 6B, and 6C are longitudinal aberration diagrams of Numerical Embodiment 3 at the wide angle end, at the intermediate zoom position (at the focal length of 357 mm), and at the telephoto end, respectively. FIG. 7 is a cross sectional view of a zoom lens system according to Embodiment 4 (Numerical Embodiment 4) of the present invention at the wide angle end in the focus state during focusing on an infinitely-distant object. FIGS. 8A, 8B, and 8C are longitudinal aberration diagrams of Numerical Embodiment 4 at the wide angle end, at the intermediate zoom position (at the focal length of 357 mm), and at the telephoto end, respectively. FIG. 9 is a cross sectional view of a zoom lens system according to Embodiment 5 (Numerical Embodiment 5) of the present invention at the wide angle end in the focus state during focusing on an infinitely-distant object. FIGS. 10A, 10B, and 10C are longitudinal aberration diagrams of Numerical Embodiment 5 at the wide angle end, at the intermediate zoom position (at the focal length of 351 mm), and at the telephoto end, respectively. FIG. 11 is a cross sectional view of a zoom lens system according to Embodiment 6 (Numerical Embodiment 6) of the present invention at the wide angle end in the focus state during focusing on an infinitely-distant object. FIGS. 12A, 12B, and 12C are longitudinal aberration diagrams of Numerical Embodiment 6 at the wide angle end, at the intermediate zoom position (at the focal length of 351 mm), and at the telephoto end, respectively. FIG. 13 is a cross sectional view of a zoom lens system according to Embodiment 7 (Numerical Embodiment 7) of the present invention at the wide angle end in the focus state during focusing on an infinitely-distant object. FIGS. 14A, 14B, and 14C are longitudinal aberration diagrams of Numerical Embodiment 7 at the wide angle end, at the intermediate zoom position (at the focal length of 351 mm), and at the telephoto end, respectively.

The zoom lens system according to each of the embodiments includes a first lens unit (focus lens unit) U1 for focusing, a second lens unit (variator) U2 for variation of magnification, a third lens unit (compensator) U3, and a fourth lens unit (relay lens unit) U4, which are arranged in the stated order from the object side to the image side. The first lens unit U1 has a positive refractive power. The second lens unit U2 has a negative refractive power and moves to the image side during zooming from the wide angle end (short-focal length end) to the telephoto end (long-focal length end). The third lens unit U3 has a positive refractive power and nonlinearly moves on an optical axis in conjunction with the movement of the second lens unit U2 for correcting shift of an image plane due to variation of magnification. The fourth lens unit U4 does not move for zooming and has a positive refractive power for imaging. The second lens unit U2 and the third lens unit U3 serve as a magnification varying system. In the cross sectional view of a zoom lens system, an aperture stop SP is disposed on the image side of the third lens unit U3. An optical member P, such as a color separation prism or an optical filter, is illustrated as a glass block. An image plane IP corresponds to an image pickup plane of a solid state image pickup element (photoelectric transducer).

In each aberration graph, spherical aberration is illustrated with respect to g-line (indicated with a chain double-dashed line), e-line (indicated with a solid line), and C-line (indicated with an alternate long and short dash line). Further, astigmatism is illustrated on a meridional image plane (indicated with a dotted line) with respect to e-line and a sagittal image plane (indicated with solid line) with respect to e-line. In addition, lateral chromatic aberration is illustrated with respect to g-line (indicated with a chain double-dashed line) and C-line (indicated with an alternate long and short dash line). An F-number is denoted by Fno and a half angle of view is denoted by ω. In each aberration graph, spherical aberration is illustrated in the unit of 0.4 mm, astigmatism in the unit of 0.4 mm, distortion in the unit of 5%, and lateral chromatic aberration in the unit of 0.05 mm. Note that, in each exemplary embodiment described below, each of the wide angle end and the telephoto end refers to a zooming position when a lens unit for magnification varying (the second lens unit U2) is positioned at each of the ends of a range in which the lens unit for variation of magnification may mechanically move along the optical axis.

Next, features of the respective embodiments are described. In the zoom lens system according to each of the embodiments, the third lens unit U3 includes at least four positive lenses and at least one negative lens and satisfies the following conditions.

$$-2.0\times10^{-3} < (\theta pa - \theta na)/(\nu pa - \nu na) < -1.4\times10^{-3} \tag{1}$$

$$41 < \nu pa - \nu na < 53 \tag{2}$$

$$2.9 < SGa3 < 3.2 \tag{3}$$

where $\nu na$ and $\theta na$ represent an average Abbe number and an average partial dispersion ratio of the materials, respectively, of the negative lenses included therein in case where the third lens unit U3 includes a plurality of negative lenses or an Abbe number and a partial dispersion ratio, respectively, of a material of the negative lens included in the third lens unit U3 in case where the third lens unit U3 includes one negative lens, $\nu pa$ and $\theta p$ represent an average Abbe number and an average partial dispersion ratio of the materials, respectively, of the positive lenses included therein in case where the third lens unit U3 includes a plurality of positive lenses or an Abbe number and a partial dispersion ratio, respectively, of a material of the positive lens included in the third lens unit U3 in case where the third lens unit U3 includes one positive lens, SGa3 represents an average specific gravity of the respective lenses included in the third lens unit U3.

In the zoom lens system according to each of the embodiments, the lens structures of the third lens unit U3, particularly, dispersion characteristics and specific gravities of lens materials of the respective lenses are suitably defined. Therefore, while a secondary spectrum of longitudinal chromatic aberration on the telephoto side from the intermediate zoom position is excellently corrected, the third lens unit U3 is reduced in weight to reduce a drive torque for the variation of magnification, to thereby obtain excellent zoom operability.

Conditional Expression (1) is a condition for reducing a residual amount of the secondary spectrum of the longitudinal chromatic aberration in the third lens unit U3, to thereby suitably correct the secondary spectrum of longitudinal chromatic aberration on the telephoto end side from the intermediate zoom position. In each exemplary embodiment, the partial dispersion ratio and the Abbe number of the material of the optical device (lens) used in this exemplary embodiment are defined as follows. Refractive indices with respect to g-line (wavelength: 435.8 nm), F-line (wavelength: 486.1 nm), d-line (wavelength: 587.6 nm), and C-line (wavelength: 656.3 nm) of Fraunhofer line are denoted by Ng, NF, Nd, and NC, respectively. The Abbe number $\nu d$ and the partial dispersion ratio $\theta gF$ with respect to g-line and F-line are defined by the following expressions.

$$\nu d = (Nd - 1)/(NF - NC) \tag{25}$$

$$\theta gF = (Ng - NF)/(NF - NC) \tag{26}$$

Each exemplary embodiment sets the lens configuration of the third lens unit U3 in the above-mentioned manner and satisfies the condition, to thereby effectively execute achromatism.

Figure 16:
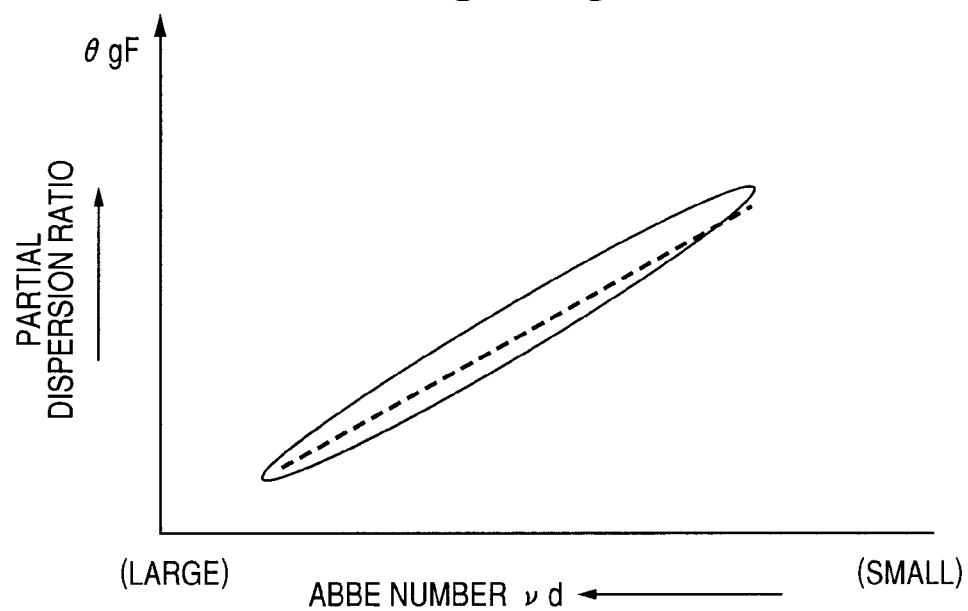
FIG. 16 is a schematic diagram illustrating a relationship between an Abbe number and a partial dispersion ratio.

FIG. 16 illustrates a relationship between the Abbe number νd and the partial dispersion ratio θgF. As illustrated in FIG. 16, a partial dispersion ratio θgF of a conventional optical material is distributed in a narrow range with respect to the Abbe number νd. In general, the smaller the Abbe number νd is, the greater the partial dispersion ratio θgF is. A condition for effectively correcting chromatic aberration in a thin contact lens system including two lenses G1 and G2 having refractive powers φ1 and φ2 and Abbe numbers ν1 and ν2, respectively, may be expressed by the following expression.

$$\varphi 1/\nu 1+\varphi 2/\nu 2=E \tag{27}$$

In this case, a combined refractive power φ may be expressed by the following expression.

$$\varphi=\varphi 1+\varphi 2 \tag{28}$$

The same condition may be applied to the thin contact lens system including three or more lenses. If E=0 in expression (28), then in correcting chromatic aberration, the imaging positions of C-line and F-line match each other. In particular, in a zoom lens system having a high zoom ratio, in order to effectively control variation of chromatic aberration due to magnification varying, the zoom lens system corrects chromatic aberration in each lens unit (that is, "E" in expression (28)) to the level as low as approximately 0.

Figure 15A:
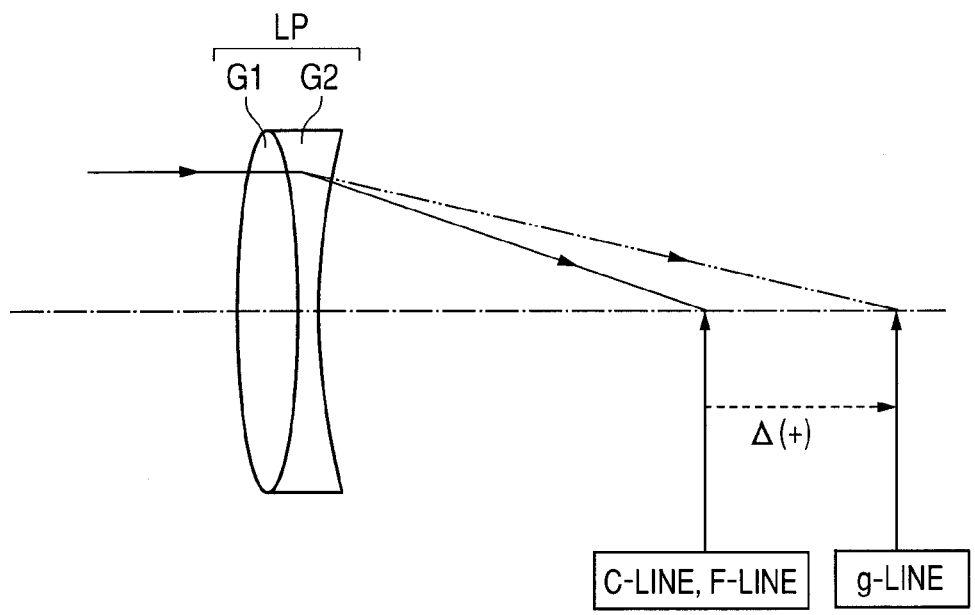
FIG. 15A is a schematic diagram illustrating two-color achromatism and residual secondary spectrum.

In FIG. 15A, in executing achromatism in a lens unit LP having a positive refractive power, a positive lens G1 is made of a material having a high Abbe number ν1 while a negative lens G2 is made of a material having a low Abbe number ν2. Accordingly, as illustrated in FIG. 16, the positive lens G1 has a low partial dispersion ratio θ1 while the negative lens G2 has a high partial dispersion ratio θ2. Therefore, when chromatic aberration is corrected with respect to F-line and C-line, the imaging position of g-line is displaced towards the image side. In focusing on an infinitely-distant object, an amount of secondary spectrum Δ, which is an amount of displacement when light flux is incident to the zoom lens system, may be expressed by the following expression.

$$\Delta=-(1/\varphi)\cdot(\theta 1-\theta 2)/(\nu 1-\nu 2) \tag{29}$$

Figure 15B:
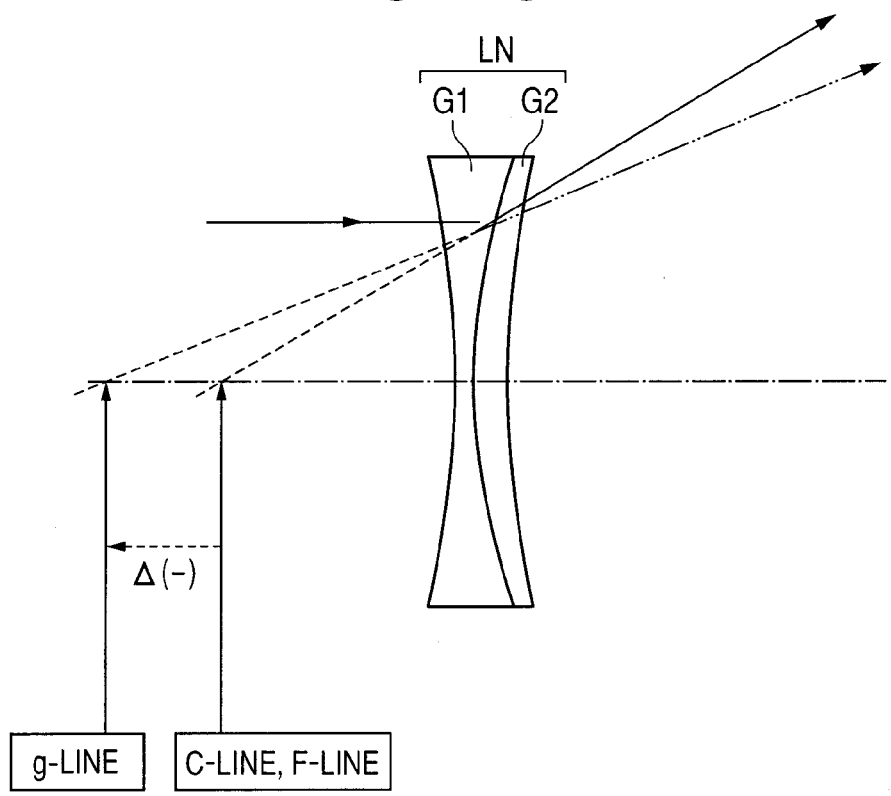
FIG. 15B is a schematic diagram illustrating two-color achromatism and residual secondary spectrum.

In FIG. 15B, in executing achromatism in a lens unit LN having a negative refractive power, a negative lens G1 is made of a material having a high Abbe number ν1 while a positive lens G2 is made of a material having a low Abbe number ν2. Accordingly, as illustrated in FIG. 16, when chromatic aberration with respect to F-line and C-line is corrected, the imaging point of g-line is displaced towards the object side. Therefore, a value of the secondary spectrum amount Δ becomes negative. In the four-unit zoom lens system according to each exemplary embodiment, the phenomenon may occur in the second lens unit U2 having a negative refractive power.

Here, image formation magnifications of the second lens unit U2, the third unit U3, and the fourth lens unit U4 are denoted by β2, β3, and β4, respectively. In this case, the following expression is satisfied.

$$\Delta = \Delta 1 \times \beta 2^2 \times \beta 3^2 \times \beta 4^2 + \Delta 2 \times (\beta 2-1)^2 \times \beta 3^2 \times \beta 4^2 + \\ \Delta 3 \times (\beta 3-1)^2 \times \beta 4^2 + \Delta 4 \times (\beta 4-1)^2 \tag{31}$$

Note that Δi indicates a secondary spectrum amount of an i-th lens unit. In expression (31), the first term is negative, the second term is positive, and the third term is negative.

Figure 18A:
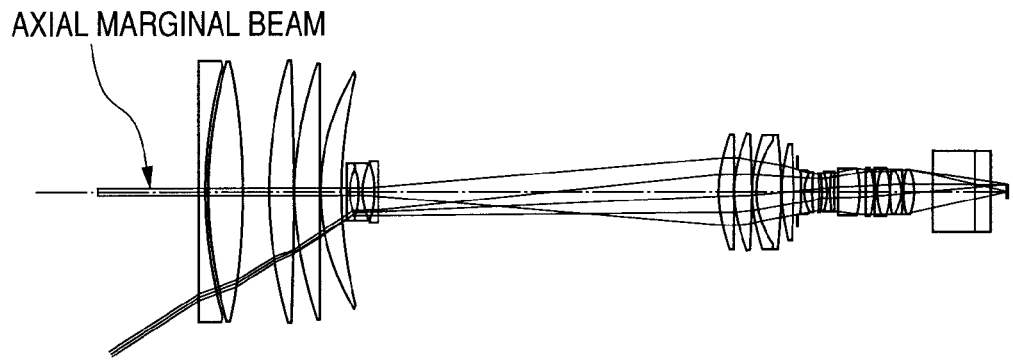
FIG. 18A is a diagram illustrating an optical path at the wide angle end of the zoom lens according to the embodiments of the present invention.
Figure 18B:
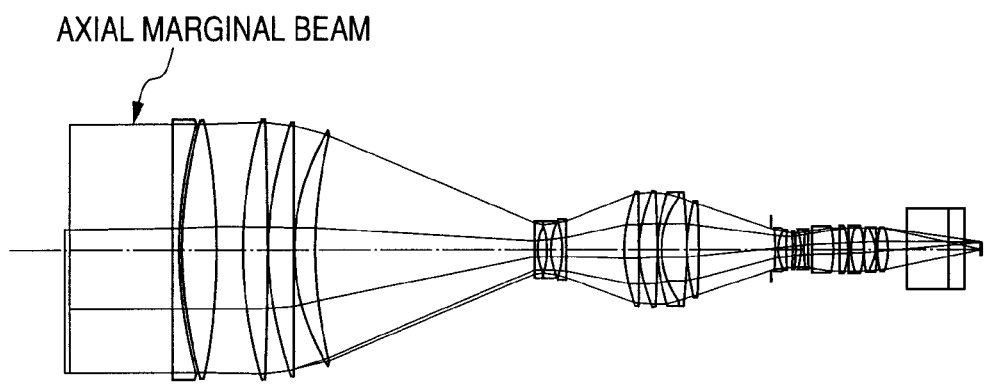
FIG. 18B is a diagram illustrating an optical path at the intermediate zoom position (351 mm) of the zoom lens according to the embodiments of the present invention.
Figure 18C:
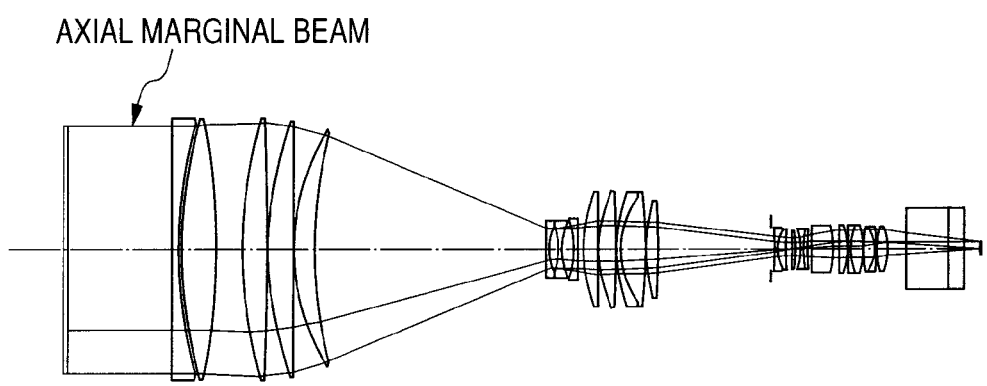
FIG. 18C is a diagram illustrating an optical path at the telephoto end of the zoom lens according to the embodiments of the present invention.

FIG. 18A is a diagram illustrating an optical path at the wide angle end according to the embodiments. FIG. 18B is a diagram illustrating an optical path at the intermediate zoom position (351 mm) according to the embodiments. FIG. 18C is a diagram illustrating an optical path at the telephoto end according to the embodiments. According to the embodiments, when an F number of the entire system at the wide angle end is denoted by Fwide and an F number of the entire system at the telephoto end is denoted by Ftele, a focal length at the intermediate zoom position (fmid) is briefly set as follows.

$$f\text{mid} \leq f\text{tele} \times F\text{wide}/F\text{tele} \tag{30}$$

In the four-unit zoom lens system according to each of the embodiments, the secondary spectrum amount Δ is significantly generated in the first lens unit U1 in which a refractive power is small and an axial marginal ray passes through a high position on the telephoto side. In the third lens unit U3, an axial marginal ray passes through low positions at the wide angle end and at the telephoto end and passes through the highest position at the intermediate zoom position (fmid), and hence a variation in longitudinal chromatic aberration in the vicinity of the intermediate zoom position (fmid) is greatly affected. The third lens unit U3 moves during variation of magnification and an absolute value of an image formation magnification β3 increases on the telephoto side. Therefore, when an absolute value of the secondary spectrum amount Δ3 is reduced, a variation in secondary spectrum amount Δ due to magnification varying and the secondary spectrum amount Δ at the telephoto end may be effectively suppressed. Further, a tolerable amount of residual secondary spectrum Δ1 increases, which allows the difference between the Abbe numbers of the materials of the positive lens and the negative lens of the first lens unit U1 to be increased so that the refractive power of each constituent lens may be reduced, to thereby reduce the total thickness of the first lens unit U1.

In view of the above-mentioned problem, Conditional Expression (1) is employed for appropriately setting the Abbe number and the partial dispersion ratio of the materials of the positive lenses and the negative lenses included in the third lens unit U3. If the upper limit of the Condition Expression (1) is exceeded, the secondary spectrum may be undercorrected by the third lens unit U3. Accordingly, it is difficult to effectively correct longitudinal chromatic aberration at the telephoto end. It is further preferred that the upper limit of the Conditional Expression (1) be altered as follows.

$$(\theta pa-\theta na)/(\nu pa-\nu na) > -1.7 \times 10^{-3} \tag{1a}$$

Conditional Expression (2) suitably defines an average Abbe number difference value between the positive lenses and the negative lenses included in the third lens unit U3. Therefore, chromatic aberration in the third lens unit U3 is suitably corrected and the third lens unit U3 is reduced in weight so that a drive force for the variation of magnification operation may be reduced, to thereby obtain excellent operability. A work T during the magnification varying operation is expressed as follows, $$T \approx m2 \cdot W2 + m3 \cdot W3 \tag{32},$$

where W2 and W3 represent a mass of the second lens unit U2 and a mass of the third lens unit U3, respectively, and m2 and m3 represent the amount of movement of the second lens unit U2 and the amount of movement of the third lens unit U3 during variation of magnification, respectively.

Here, a mass Wi of the i-th lens unit is briefly expressed by the following expression, $Wi$=(volume of each lens included in $i$-th lens unit)·(specific gravity of each lens included in $i$-th lens unit), $$\approx \pi \cdot (eai/2)^2 \times bdi \times SGai \cdot C \quad (33)$$

where bai represents a maximum effective diameter of the i-th lens unit, bdi represents a lens structure length, and SGai represents an average specific gravity value of constituent lenses. C indicates a coefficient, which is a value corresponding to a volume ratio of materials of the i-th lens unit relative to a cylinder having a diameter eai and a length bdi. When the lens unit has a positive refractive power, the coefficient C is in a range of approximately 0.5 to 0.7. When the lens unit has a negative refractive power, the coefficient C is in a range of approximately 0.6 to 0.8.

In the zoom lens system according to the present invention, a maximum effective diameter ea3 of the third lens unit U3 is approximately a double of a maximum effective diameter ea2 of the second lens unit U2. A lens structure length bd3 of the third lens unit U3 is equal to or larger than a double of a lens structure length bd2 of the second lens unit U2. Therefore, the mass of the third lens unit U3 is significantly larger than the mass of the second lens unit U2. Thus, an influence of the third lens unit U3 is dominant in Expression (32), and hence it is important to reduce the weight of the third lens unit U3 in order to reduce the work T. In particular, when a high magnification (high zoom ratio) and a large aperture diameter are to be realized, the maximum effective diameter ea3 needs to be significantly increased, and hence it is necessary to reduce the lens structure length bd3 or the average specific gravity value SGa3 of the constituent lenses in Expression (33), in order to suppress an increase in mass of the third lens unit U3. In this case, a ratio between the maximum effective diameter ea3 and the lens structure length bd3 is desirably set to satisfy the following condition.

$$0.6 < bd3/ea3 < 0.8 \quad (34)$$

When bd3/ea3 exceeds the upper limit of Conditional Expression (34), the mass of the third lens unit U3 increases. When bd3/ea3 falls below the lower limit of Conditional Expression (34), the mass of the third lens unit U3 reduces. However, it is difficult to select materials satisfying Conditional Expressions (1) and (2). The numerical range of Conditional Expression (34) is further desirably set as follows.

$$0.63 < bd3/ea3 < 0.75 \quad (34a)$$

As is known from Expressions (27) and (28), as the Abbe number of the positive lens material is increased and the Abbe number of the negative lens material is reduced, the refractive power of each lens becomes smaller. When the refractive power becomes smaller, a curvature of each lens surface becomes smaller. When the same effective diameter is provided, a maximum thickness of each lens reduces and thus the lens constituent length bd3 becomes smaller, and hence the reduction in weight may be achieved. When "vpa−vna" falls below the lower limit of Conditional Expression (2), the refractive power of each lens included in the third lens unit U3 becomes larger, and hence the volume of the third lens unit U3 increases to increase the mass thereof, to thereby increase a drive torque for the variation of magnification operation. When "vpa−vna" exceeds the upper limit of Conditional Expression (2), the volume of each lens reduces. However, it is difficult to select materials also satisfying Conditional Expression (3) described below. Conditional Expression (3) is a condition for suitably defining an average specific gravity SG of materials of all lenses included in the third lens unit U3 to reduce the weight of the third lens unit U3.

As illustrated in FIGS. 18A to 18C, in the third lens unit U3, an axial marginal ray passes through a high position at the intermediate zoom position. As is known from Expression (30), the influence on longitudinal chromatic aberration is large between the intermediate zoom position and the telephoto end between which the image formation magnification β3 is relatively large. Such a tendency becomes remarkable as the zoom ratio increases. When the respective lens materials of the third lens unit U3 are to be selected to satisfy Conditional Expressions (1) and (2), it is necessary for the positive lens to heavily use an optical material, which is so-called an extraordinary dispersion material, of which the Abbe number is in a range of approximately 60 to 100, the partial dispersion ratio θgF is large, and the extraordinary dispersion ΔθgF is positively large. The extraordinary dispersion material is marketed as, for example, S-FPL 51 (produced by OHARA INC.) or S-FPL 53 (produced by OHARA INC.), and often has a refractive index in a range of 1.4 to 1.6, an Abbe number in a range of 60 to 96, and a specific gravity in a range of 3.5 to 4.6. A crystal material such as fluorite is also the extraordinary dispersion material. However, the crystal material has a linear expansion coefficient and a refractive index which greatly depend on temperature more than in a case of optical glass, and thus change in optical performance due to a variation in environmental temperature is large. Therefore, the crystal material is not generally used for the third lens unit U3. It is necessary to use a glass material of which an Abbe number is equal to or smaller than 28 for the negative lens, but a specific gravity of the glass material is equal to or larger than 3.0, and hence an average specific gravity of a structure including at least four positive lenses and a negative lens becomes equal to or larger than 3.4.

When SGa3 exceeds the upper limit of Conditional Expression (3), the mass of the third lens unit U3 increases, which increases a drive torque for the magnification varying operation, leading to degradation in operability. When SGa3 falls below the lower limit of Conditional Expression (3), the volume of the third lens unit U3 reduces. However, a ratio of the extraordinary dispersion material used for the positive lens reduces, and hence it is difficult to satisfy Conditional Expression (1). The numerical ranges of Conditional Expressions (1a), (2), and (3) are further desirably set as follows.

$$-1.67 \times 10^{-3} < (\theta pa - \theta na)/(vpa - vna) < -1.45 \times 10^{-3} \quad (1b)$$

$$48 < vpa - vna < 52 \quad (2a)$$

$$3.00 < SGa3 < 3.15 \quad (3a)$$

As described above, according to the respective embodiments, a zoom lens system is obtained in which an longitudinal chromatic aberration and a lateral chromatic aberration are suitably corrected to achieve appropriate optical performance over the entire zoom range while the third lens unit U3 is reduced in weight. Further, at least one of the following conditions is desirably satisfied.

A focal length of a negative lens made of a material having a smallest Abbe number, of the lenses included in the third lens unit U3, the Abbe number of the material, and a partial dispersion ratio of the material are denoted by f3n, vn, and θn, respectively. A focal length of a positive lens made of a material having a largest Abbe number, the Abbe number of the material, and a partial dispersion ratio of the material are denoted by f3p, vp, and θp, respectively. The focal length of the first lens unit U1, the focal length of the second lens unit U2, and the focal length of the third lens unit U3 are denoted by f1, f2, and f3, respectively. A total value of refractive powers of positive lenses included in the third lens unit U3 is denoted by $\phi p$ and a total value of refractive powers of negative lenses included in the third lens unit U3 is denoted by $\phi n$. A refractive power of the third lens unit U3 is denoted by $\phi 3$. An Abbe number, a partial dispersion ratio, a refractive index, and a specific gravity of a material of at least one positive lens $G3_{p1}$ of the positive lenses included in the third lens unit U3 are denoted by $\nu 3_{p1}$, $\theta 3_{p1}$, $N3_{p1}$, and $SG3_{p1}$, respectively. An Abbe number, a partial dispersion ratio, a refractive index, and a specific gravity of a material of at least one positive lens $G3_{p2}$ except the positive lens $G3_{p1}$, of the positive lenses included in the third lens unit U3 are denoted by $\nu 3_{p2}$, $\theta 3_{p2}$, $N3_{p2}$, and $SG3_{p2}$, respectively. An Abbe number, a partial dispersion ratio, a refractive index, and a specific gravity of a material of a negative lens $G3_{n1}$ included in the third lens unit U3 are denoted by $\nu 3_{n1}$, $\theta 3_{n1}$, $N3_{n1}$, and $SG3_{n1}$, respectively. A focal length of the zoom lens system at the wide angle end and a focal length thereof at the telephoto end are denoted by fwide and ftele, respectively. In this case, at least one of the following conditional expressions is desirably satisfied.

$$-1.2\times 10^{-3} < (\theta p - \theta n)/(\nu p - \nu n) < -1.1\times 10^{-3} \quad (4)$$

$$0.8 < (1/f3)/(1/f3p - 1/f3n) < 1.1 \quad (5)$$

$$1.6 < \phi p/\phi 3 < 1.7 \quad (6)$$

$$-0.6 < \phi n/\phi 3 < -0.4 \quad (7)$$

$$60 < \nu 3_{p1} < 75 \quad (8)$$

$$0.53 < \theta 3_{p1} < 0.54 \quad (9)$$

$$1.55 < N3_{p1} < 1.65 \quad (10)$$

$$3.0 < SG3_{p1} < 3.2 \quad (11)$$

$$60 < \nu 3_{p2} < 75 \quad (12)$$

$$0.52 < \theta 3_{p2} < 0.54 \quad (13)$$

$$1.45 < N3_{p2} < 1.55 \quad (14)$$

$$2.4 < SG3_{p2} < 2.6 \quad (15)$$

$$20 < \nu 3_{n1} < 28 \quad (16)$$

$$0.6 < \theta 3_{n1} < 0.615 \quad (17)$$

$$1.7 < N3_{n1} < 2.0 \quad (18)$$

$$3.0 < SG3_{n1} < 3.7 \quad (19)$$

$$14.5 < f\text{tele}/f3 < 17.0 \quad (20)$$

$$27 < f1 \times f3/f2^2 < 29 \quad (21)$$

$$9.5 < |f1/f2| < 11 \quad (22)$$

$$3.9 < f\text{tele}/f1 < 6 \quad (23)$$

$$24 < f1/f\text{wide} < 30 \quad (24)$$

Next, technical meanings of the respective conditional expressions described above are described.

Conditional Expressions (4) and (5) are conditions for suitably defining Abbe numbers and partial dispersion ratios of materials for a positive lens and a negative lens, which are most effective to correct a secondary spectrum in the third lens unit U3, to thereby excellently correct a variation in longitudinal chromatic aberration between the intermediate zoom position and the telephoto end. Conditional Expression (4) defines a condition on the Abbe numbers and the partial dispersion ratios of the materials for particularly the positive lens and the negative lens, which are most effective to correct the secondary spectrum in the third lens unit U3, of the lenses included in the third lens unit U3. When "$(\theta p - \theta n)/(\nu p - \nu n)$" falls below the lower limit of Conditional Expression (4), an effect of correcting the secondary spectrum in the third lens unit U3 is insufficient. Therefore, it is difficult to excellently correct the variation in longitudinal chromatic aberration between the intermediate zoom position and the telephoto end while achieving the high magnification (high zoom ratio). When "$(\theta p - \theta n)/(\nu p - \nu n)$" exceeds the upper limit of Conditional Expression (4), an excellent effect of correcting the secondary spectrum in the third lens unit U3 is produced. However, it is difficult to select the materials of the lenses to be included in the third lens unit U3, and hence it is difficult to satisfy all Conditional Expressions (1), (2), and (3).

Conditional Expression (5) defines a relationship between the refractive power of the entire third lens unit U3, and the refractive powers of the positive lens and the negative lens which are most effective to correct the secondary spectrum in the third lens unit U3. When "$(1/f3)/(1/f3p-1/f3n)$" exceeds the upper limit of Conditional Expression (5), the correction for the secondary spectrum in the third lens unit U3 is insufficient, and hence, it is difficult to excellently correct the variation in longitudinal chromatic aberration between the intermediate zoom position and the telephoto end while achieving the high magnification (high zoom ratio). When "$(1/f3)/(1/f3p-1/f3n)$" falls below the lower limit of Conditional Expression (5), the secondary spectrum in the third lens unit U3 is corrected excellently. However, the absolute values of the focal length f3p and the focal length f3n reduce to increase the refractive powers, and hence the volumes and masses of the lenses increase. Conditional Expressions (6) and (7) are conditions for defining refractive power ratios between the positive lens and negative lens of the third lens unit U3 and the entire third lens unit U3 to thereby excellently correct the variation in longitudinal chromatic aberration between the intermediate zoom position and the telephoto end. Conditional Expression (6) defines the ratio of the refractive power of the positive lens of the third lens unit U3 to the refractive power of the entire third lens unit U3. Conditional Expression (7) defines the ratio of the refractive power of the negative lens included in the third lens unit U3 to the refractive power of the entire third lens unit U3. When $\phi p/\phi 3$ falls below the lower limit of Conditional Expression (6) or $\phi n/\phi 3$ exceeds the upper limit of Conditional Expression (7), the effect of correcting the secondary spectrum in the third lens unit U3 is insufficient. As a result, it is difficult to excellently correct the variation in longitudinal chromatic aberration between the intermediate zoom position and the telephoto end while achieving the high magnification (high zoom ratio).

Conditional Expressions (8) to (19) are conditions for the materials of the respective lenses included in the third lens unit U3. When materials satisfying the Conditional Expressions (8) to (19) are used, Conditional Expressions (1), (2), and (3) are satisfied in a balanced manner. In addition, the secondary spectrum is easily and excellently corrected. Conditional Expressions (8) to (11) define optical characteristics of the material of the positive lens $G3_{p1}$ to be used for the third lens unit U3. The conditional expressions provide that a material having positive extraordinary dispersion and a relatively low specific gravity may be used. At least one positive lens $G3_{p1}$ of the positive lenses included in the third lens unit U3 desirably satisfies Conditional Expressions (8) to (11). Conditional Expressions (12) to (15) define optical characteristics of the material of the positive lens $G3_{p2}$ to be used for the third lens unit U3. A material having small extraordinary dispersion and a low specific gravity is effective in reducing the average specific gravity value SGa to satisfy Conditional Expression (3). At least one positive lens $G3_{p2}$ of the positive lenses included in the third lens unit U3 desirably satisfies Conditional Expressions (12) to (15).

Conditional Expressions (16) to (19) define optical characteristics of the material of the at least one negative lens $G3_{n1}$ of the negative lenses to be used for the third lens unit U3. When the conditional expressions (16) to (19) are satisfied, the secondary spectrum in the third lens unit U3 is excellently corrected. Conditional Expressions (20) to (24) define relationships among the refractive powers of the respective lens units to define various conditions for achieving a high magnification (high zoom ratio) equal to or larger than 100× zoom ratio, high optical performance, and a reduction in size of the entire system at the same time. Conditional Expression (20) is used to define a ratio between the focal length of the zoom lens system at the telephoto end and the focal lens of the third lens unit U3 to excellently correct variations in aberrations due to variation of magnification (zooming) while achieving the high magnification (high zoom ratio). When ftele/f3 falls below the lower limit of Conditional Expression (20), the refractive power of the third lens unit U3 becomes smaller, which is advantageous in optical performance. However, the stroke of a moved lens unit due to magnification varying increases, leading to an increase in size of the entire system. When ftele/f3 exceeds the upper limit of Conditional Expression (20), the refractive power of the third lens unit U3 becomes too large, and hence the variations in aberrations due to variation of magnification (zooming) increase.

Conditional Expression (21) is a condition for defining a relationship among the focal lengths of the first lens unit U1, the second lens unit U2, and the third lens unit U3, so that the zoom stroke may be shortened while achieving the high magnification (high zoom ratio), to thereby reduce the size of the entire system. When "f1×f3/f2$^2$" falls below the lower limit of Conditional Expression (21), the focal length of the second lens unit U2 becomes too short, and hence the size is reduced advantageously, but the variations in aberrations due to variation of magnification (zooming) increase. When "f1·f3/f2$^2$" exceeds the upper limit of Conditional Expression (21), excellent optical performance is achieved, but the stroke of a moved lens unit due to variation of magnification increases, leading to an increase in the size of the entire system. Conditional Expression (22) defines the ratio of the focal length of the first lens unit U1 to the focal length of the second lens unit U2. When Conditional Expression (22) is satisfied, longitudinal chromatic aberrations are efficiently corrected while reducing the stroke of a moved lens unit due to variation of magnification, to thereby reduce the lens total length while achieving the high magnification (high zoom ratio) equal to or larger than 100× zoom ratio. When "|f1/f2|" falls below the lower limit of Conditional Expression (22), the stroke of a moved lens unit which is caused by variation of magnification increases, leading to an increase in size of the entire system. When "|f1/f2|" exceeds the upper limit of Conditional Expression (22), the size of the entire system is reduced advantageously, but the variations in aberrations due to variation of magnification (zooming) increase.

Conditional Expression (23) defines a ratio between the focal length of the zoom lens system at the telephoto end and the focal length of the first lens unit U1, to thereby excellently correct longitudinal chromatic aberrations while achieving the high magnification (high zoom ratio). When "ftele/f1" falls below the lower limit of Conditional Expression (23), the focal length of the first lens unit U1 becomes larger, and hence it is difficult to achieve the high magnification (high zoom ratio) equal to or larger than 100× zoom ratio and to reduce the size of the entire system. When "ftele/f1" exceeds the upper limit of Conditional Expression (23), the size of the entire system is reduced advantageously, but it is difficult to excellently correct the optical performance at the telephoto end, in particular, the longitudinal chromatic aberrations. Conditional Expression (24) defines a ratio between the focal length of the first lens unit U1 and the focal length of the zoom lens system at the wide angle end. When "f1/fwide" falls below the lower limit of Conditional Expression (24), the size of the entire system is reduced advantageously, but it is difficult to increase the field angle at the wide angle end. When "f1/fwide" exceeds the upper limit of Conditional Expression (24), the field angle at the wide angle end is increased advantageously, but an effective diameter of the first lens unit U1 increases, which makes it difficult to reduce the size of the entire system. More preferably, the ranges of the values in Conditional Expressions (4) to (7) and (20) to (24) are set as follows.

$$-1.18\times10^{-3}<(\theta p-\theta n)/(\nu p-\nu n)<-1.1\times10^{-3} \tag{4a}$$

$$0.85<(1/f3)/(1/f3p-1/f3n)<1.08 \tag{5a}$$

$$1.603<\phi p/\phi 3<1.690 \tag{6a}$$

$$-0.56<\phi n/\phi 3<-0.44 \tag{7a}$$

$$14.51<f\text{tele}/f3<16.90 \tag{20a}$$

$$27.02<f1\times f3/f2^2<28.80 \tag{21a}$$

$$9.7<|f1/f2|<10.5 \tag{22a}$$

$$3.9<f\text{tele}/f1<5.0 \tag{23a}$$

$$24.5<f1/f\text{wide}<29.5 \tag{24a}$$

In each of the embodiments, the third lens unit U3 includes a biconvex positive lens, a biconvex positive lens, a negative meniscus lens having a convex surface facing toward the object, a positive lens having a convex surface facing toward the object, and a positive lens having a convex surface facing toward the object, which are provided in the stated order from the object side to the image side. Alternatively, the third lens unit U3 includes a biconvex positive lens, a biconvex positive lens, a biconvex positive lens, a negative lens having a concave surface facing toward the object, and a positive lens having a convex surface facing toward the object, which are provided in the stated order from the object side to the image side. With the arrangement, the secondary spectrum generated in the third lens unit U3 is reduced, so that the variations in aberrations due to zooming may be reduced, to thereby easily obtain high optical performance over the entire zoom range.

Next, other features of the lens structures according to the respective embodiments are described, except the features described above.

Embodiment 1

The structure of the third lens unit U3 according to Embodiment 1 is described. In Numerical Embodiment 1, lenses included in the third lens unit U3 correspond to the eighteenth surface to the twenty-sixth surface. The third lens unit U3 includes a biconvex positive lens G1, a biconvex positive lens G2, a negative meniscus lens G3 having a convex surface facing toward the object, a biconvex positive lens G4, and a biconvex positive lens G5, which are provided in the stated order from the object side to the image side. An image side surface of the positive lens G1 has an aspherical shape. An object side surface of the positive lens G5 has an aspherical shape. The negative lens G3 and the positive lens G4 are cemented to each other. The positive lens G2 corresponds to the positive lens $G3_{p1}$, and satisfies Conditional Expressions (8), (9), (10), and (11). Each of the positive lenses G1 and G5 corresponds to the positive lens $G3_{p2}$, and satisfies Conditional Expressions (12), (13), (14), and (15). The negative lens G3 satisfies Conditional Expressions (16), (17), (18), and (19).

The zoom lens system according to this embodiment includes the first lens unit U1, the second lens unit U2, and the fourth lens unit U4, which are provided in order of from the object side to the image side. The first lens unit U1 includes five lenses, that is, a negative lens having a concave surface facing toward the image side, three positive lenses each having a convex surface facing toward the object side, and a positive meniscus lens having a convex surface facing toward the object side, which are provided in order of from the object side to the image side. The second lens unit U2 includes four lenses, that is, a negative lens having a concave surface facing toward the image side, a cemented lens constituted by a biconcave negative lens and a positive lens having a convex surface facing toward the object side, and a negative lens having a concave surface facing toward the object side, which are provided in order of from the object side to the image side. The fourth lens unit U4 includes 12 lenses in total, including a positive lens and a negative lens. Corresponding values of the respective conditional expressions in this embodiment are shown in Table 1. Numerical Embodiment 1 satisfies any of the conditional expressions. According to this embodiment, there is provided a zoom lens system capable of achieving a high magnification (high zoom ratio) such as 100× zoom ratio, while being reduced in total lens length, attaining high optical performance, which excels in operability with a reduced zoom drive torque.

In this embodiment, the mass W2 of the second lens unit U2 and the mass W3 of the third lens unit U3 are calculated based on maximum effective diameter values of the respective lenses, and obtained as follows.
W2=142 (g)
W3=665 (g)
Further, the following values are provided.
ea2=43.858
ea3=86.273
bd2=25.392
bd3=59.152
Therefore, the coefficient C in Expression (33) is obtained as follows.
C (second lens unit)=0.744
C (third lens unit)=0.626
The amount of movement m2 of the second lens unit U2 and the amount of movement m3 of the third lens unit U3 for magnification varying from the wide angle end to the telephoto end are obtained as follows.
m2=174.59 (mm)
m3=83.76 (mm)
The work T is obtained as follows.
T=8.05×10⁴ (g·mm)

Embodiment 2

In Embodiment 2, the respective lenses of the lens structure including the first lens unit U1 to the fourth lens unit U4 have the same shapes (including aspherical shape) as in Embodiment 1. The same effects as in Embodiment 1 are obtained. The positive lens G2 (corresponding to positive lens $G3_{p1}$) satisfies Conditional Expressions (8), (9), (10), and (11). Each of the positive lenses G1 and G5 (corresponding to positive lens $G3_{p2}$) satisfies Conditional Expressions (12), (13), (14), and (15). The negative lens G3 satisfies Conditional Expressions (16), (17), (18), and (19).

In this embodiment, the mass W2 of the second lens unit U2 and the mass W3 of the third lens unit U3 are calculated based on maximum effective diameter values of the respective lenses and obtained as follows.
W2=133 (g)
W3=655 (g)
Further, the following values are provided.
ea2=44.113
ea3=85.427
bd2=25.925
bd3=59.725
Therefore, the coefficient C in Expression (33) is obtained as follows.
C (second lens unit)=0.678
C (third lens unit)=0.623
The amount of movement m2 of the second lens unit U2 and the amount of movement m3 of the third lens unit U3 for variation of magnification from the wide angle end and the telephoto end are obtained as follows.
m2=167.45 (mm)
m3=81.55 (mm)
The work T is obtained as follows.
T=7.57×10⁴ (g·mm)

Embodiment 3

In Embodiment 3, the respective lenses of the lens structure including the first lens unit U1 to the fourth lens unit U4 have the same shapes (including aspherical shape) as in Embodiment 1. The same effects as in Embodiment 1 are obtained. The positive lens G2 (corresponding to positive lens $G3_{p1}$) satisfies Conditional Expressions (8), (9), (10), and (11). Each of the positive lenses G1 and G5 (corresponding to positive lens $G3_{p2}$) satisfies Conditional Expressions (12), (13), (14), and (15). The negative lens G3 satisfies Conditional Expressions (16), (17), (18), and (19).

In this embodiment, the mass W2 of the second lens unit U2 and the mass W3 of the third lens unit U3 are calculated based on maximum effective diameter values of the respective lenses and obtained as follows.
W2=136 (g)
W3=686 (g)
Further, the following values are provided.
ea2=44.607
ea3=88.625
bd2=26.428
bd3=57.188
Therefore, the coefficient C in Expression (33) is obtained as follows.
C (second lens unit)=0.758
C (third lens unit)=0.633
The amount of movement m2 of the second lens unit U2 and the amount of movement m3 of the third lens unit U3 for variation of magnification from the wide angle end and the telephoto end are obtained as follows.
m2=198.14 (mm)
m3=101.94 (mm)
The work T is obtained as follows.

T=9.69×10⁴ (g·mm)

Embodiment 4

In Embodiment 4, the respective lenses of the lens structure including the first lens unit U1 to the fourth lens unit U4 have the same shapes (including aspherical shape) as in Embodiment 1. The same effects as in Embodiment 1 are obtained. The positive lens G2 (corresponding to positive lens $G3_{p1}$) satisfies Conditional Expressions (8), (9), (10), and (11). Each of the positive lenses G1 and G5 (corresponding to positive lens $G3_{p2}$) satisfies Conditional Expressions (12), (13), (14), and (15). The negative lens G3 satisfies Conditional Expressions (16), (17), (18), and (19).

In this embodiment, the mass W2 of the second lens unit U2 and the mass W3 of the third lens unit U3 are calculated based on maximum effective diameter values of the respective lenses and obtained as follows.
 W2=142 (g)
 W3=665 (g)
 Further, the following values are provided.
 ea2=44.048
 ea3=90.039
 bd2=26.921
 bd3=62.469
 Therefore, the coefficient C in Expression (33) is obtained as follows.
 C (second lens unit)=0.741
 C (third lens unit)=0.609
 The amount of movement m2 of the second lens unit U2 and the amount of movement m3 of the third lens unit U3 for variation of magnification from the wide angle end and the telephoto end are obtained as follows.
 m2=176.27 (mm)
 m3=89.14 (mm)
 The work T is obtained as follows.
 T=8.43×10⁴ (g·mm)

Embodiment 5

The structure of the third lens unit U3 in Embodiment 5 is described. In Numerical Embodiment 5, the third lens unit U3 corresponds to the eighteenth surface to the twenty-sixth surface. The third lens unit U3 includes a biconvex positive lens G1, a biconvex positive lens G2, a biconvex positive lens G3, a negative lens G4 having a concave surface facing toward the object side, and a biconvex positive lens G5, which are provided in order of from the object side to the image side. An image side surface of the positive lens G1 has an aspherical shape. An object side surface of the positive lens G5 has an aspherical shape. The positive lens G3 and the positive lens G4 are cemented to each other. The positive lens G2 corresponds to the positive lens $G3_{p1}$ and satisfies Conditional Expressions (8), (9), (10), and (11). Each of the positive lenses G1 and G5 corresponds to the positive lens $G3_{p2}$ and satisfies Conditional Expressions (12), (13), (14), and (15). The negative lens G4 satisfies Conditional Expressions (16), (17), (18), and (19). The zoom lens system according to this embodiment includes the first lens unit U1, the second lens unit U2, and the fourth lens unit U4, which are provided in order of from the object side to the image side. The first lens unit U1 includes five lenses, that is, a negative lens having a concave surface facing toward the image side, three positive lenses each having a convex surface facing toward the object side, and a positive meniscus lens having a convex surface facing toward the object side, which are provided in order of from the object side to the image side. The second lens unit U2 includes four lenses, that is, a negative lens having a concave surface facing toward the image side, a cemented lens constituted by a biconcave negative lens and a positive lens having a convex surface facing toward the object side, and a negative lens having a concave surface facing toward the object side, which are provided in order of from the object side to the image side. The fourth lens unit U4 includes 12 lenses including a positive lens and a negative lens.

Corresponding values of the respective conditional expressions in this embodiment are shown in Table 1. Numerical Embodiment 5 satisfies any of the conditional expressions. According to this embodiment, a zoom lens system is realized in which, while the high magnification of 100× zoom ratio is achieved, the total lens length is short, the high optical performance is obtained, the zoom drive torque is small, and the operability is excellent. In this embodiment, the mass W2 of the second lens unit U2 and the mass W3 of the third lens unit U3 are calculated based on maximum effective diameter values of the respective lenses and obtained as follows.
 W2=138 (g)
 W3=649 (g)
 Further, the following values are provided.
 ea2=44.072
 ea3=85.210
 bd2=24.851
 bd3=59.354
 Therefore, the coefficient C in Expression (33) is obtained as follows.
 C (second lens unit)=0.736
 C (third lens unit)=0.624
 The amount of movement m2 of the second lens unit U2 and the amount of movement m3 of the third lens unit U3 for variation of magnification from the wide angle end and the telephoto end are obtained as follows.
 m2=174.59 (mm)
 m3=83.76 (mm)
 The work T is obtained as follows.
 T=7.85×10⁴ (g·mm)

Embodiment 6

In Embodiment 6, the respective lenses of the lens structure including the first lens unit U1 to the fourth lens unit U4 have the same shapes (including aspherical shape) as in Embodiment 1. The same effects as in Embodiment 1 are obtained. The positive lens G2 (corresponding to positive lens $G3_{p1}$) satisfies Conditional Expressions (8), (9), (10), and (11). Each of the positive lenses G1 and G5 (corresponding to positive lens $G3_{p2}$) satisfies Conditional Expressions (12), (13), (14), and (15). The negative lens G3 satisfies Conditional Expressions (16), (17), (18), and (19). In this embodiment, the mass W2 of the second lens unit U2 and the mass W3 of the third lens unit U3 are calculated based on maximum effective diameter values of the respective lenses and obtained as follows.
 W2=141 (g)
 W3=673 (g)
 Further, the following values are provided.
 ea2=43.858
 ea3=85.734
 bd2=25.245
 bd3=60.238
 Therefore, the coefficient C in Expression (33) is obtained as follows.
 C (second lens unit)=0.743
 C (third lens unit)=0.649

The amount of movement m2 of the second lens unit U2 and the amount of movement m3 of the third lens unit U3 for variation of magnification from the wide angle end and the telephoto end are obtained as follows.
m2=174.59 (mm)
m3=83.76 (mm)
The work T is obtained as follows.
T=8.10×10⁴ (g·mm)

Embodiment 7

The structure of the third lens unit U3 in Embodiment 7 is described. In Numerical Embodiment 7, the third lens unit U3 corresponds to the eighteenth surface to the twenty-sixth surface. The third lens unit U3 includes a biconvex positive lens G1, a biconvex positive lens G2, a negative meniscus lens G3 having a convex surface facing toward the object side, a biconvex positive lens G4, and a biconvex positive lens G5, which are provided in order of from the object side to the image side. An image side surface of the positive lens G1 has an aspherical shape. An object side surface of the positive lens G5 has an aspherical shape. The negative lens G3 and the positive lens G4 are cemented to each other. Each of the positive lenses G1 and G2 corresponds to the positive lens $G3_{p1}$ and satisfies Conditional Expressions (8), (9), (10), and (11). The positive lens G5 corresponds to the positive lens $G3_{p2}$ and satisfies Conditional Expressions (12), (13), (14), and (15). The negative lens G3 satisfies Conditional Expressions (16), (17), (18), and (19). In this embodiment, the respective lenses in the lens structures of the first lens unit U1, the second lens unit U2, and the fourth lens unit U4 have the same shapes as in Embodiment 1. Corresponding values of the respective conditional expressions in this embodiment are shown in Table 1. Numerical Embodiment 7 satisfies any of the conditional expressions. According to this embodiment, a zoom lens system is realized in which, while the high magnification of 100× zoom ratio is achieved, the total lens length is short, the high optical performance is obtained, the zoom drive torque is small, and the operability is excellent.

In this embodiment, the mass W2 of the second lens unit U2 and the mass W3 of the third lens unit U3 are calculated based on maximum effective diameter values of the respective lenses and obtained as follows.
W2=142 (g)
W3=692 (g)
Further, the following values are provided.
ea2=43.871
ea3=85.894
bd2=25.430
bd3=58.807
Therefore, the coefficient C in Expression (33) is obtained as follows.
C (second lens unit)=0.743
C (third lens unit)=0.652
The amount of movement m2 of the second lens unit U2 and the amount of movement m3 of the third lens unit U3 for variation of magnification from the wide angle end and the telephoto end are obtained as follows.
m2=174.59 (mm)
m3=83.76 (mm)
The work T is obtained as follows.
T=8.28×10⁴ (g·mm)

Figure 17:
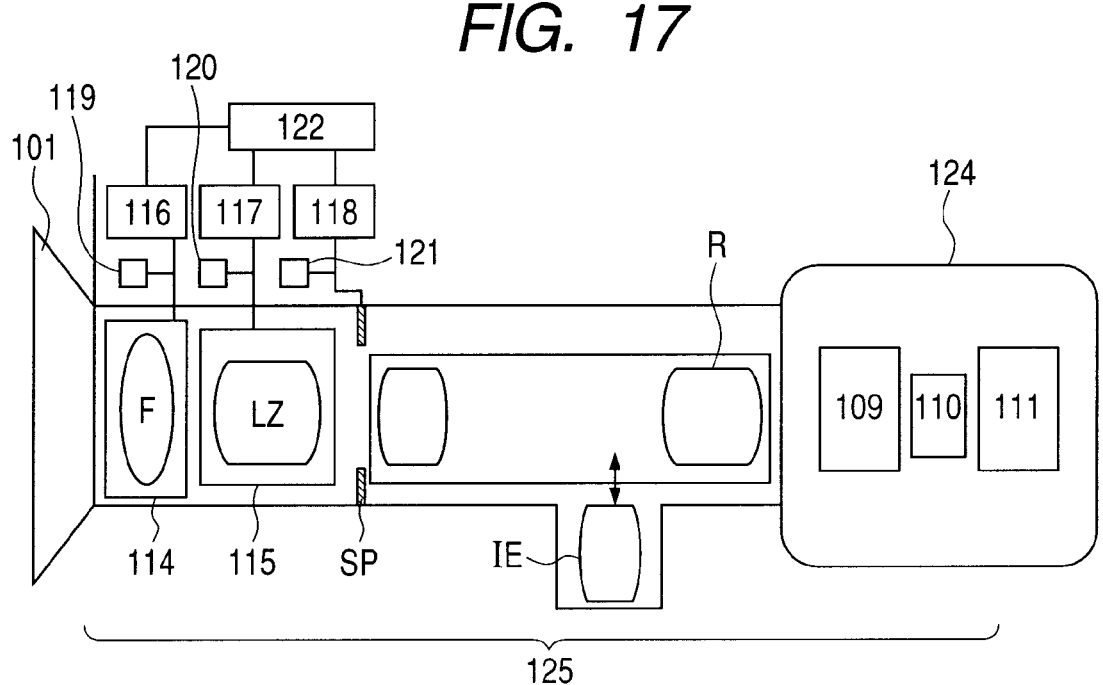
FIG. 17 is a schematic diagram illustrating a main part of an image pickup apparatus according to the present invention.

FIG. 17 is a schematic diagram illustrating a main part of an image pickup apparatus (television camera system) having the zoom lens system according to each exemplary embodiment as an image pickup optical system. Referring to FIG. 17, an image pickup apparatus 125 includes a zoom lens system 101, which is any one of the zoom lens systems according to Embodiments 1 to 7. The zoom lens system 101 may be detachably mounted on a camera body 124, to thereby constitute the image pickup apparatus 125. The zoom lens system 101 includes a first lens unit F, a magnification varying unit LZ, and a fourth lens unit for imaging R. The first lens unit F includes a focusing lens unit. The magnification varying unit LZ includes a second lens unit which moves along the optical axis to vary magnification. In addition, the magnification varying unit LZ includes a third lens unit which moves along the optical axis to correct shift of an image plane due to the variation of magnification.

Further, the zoom lens system 101 includes an aperture stop SP. The fourth lens unit for imaging R includes a lens unit IE, which may enter into or exit from the optical path. The lens unit IE may change the range of the focal length of the entire zoom lens system 101. The lens unit IE may be removed from the zoom lens system 101. In addition, the zoom lens system 101 includes driving mechanisms 114 and 115, such as a helicoid or a cam, which drives the first lens unit F and the magnification varying unit LZ, respectively, along the optical axis. The image pickup apparatus 125 includes motors (driving units) 116 to 118, which electrically drive the driving mechanisms 114 and 115 and the aperture stop SP, respectively. Detectors 119 to 121, such as an encoder, a potentiometer, or a photo-sensor, are configured to detect the position of the first lens unit F, the position of the magnification varying unit LZ on the optical axis, and the aperture diameter of the aperture stop SP. In addition, the camera body 124 includes a glass block 109, which is equivalent to an optical filter or a color separation prism provided within the camera body 124. Furthermore, the camera body 124 includes a solid state image pickup element (photoelectrical conversion element) 110, such as a charge-coupled device (CCD) sensor or a complementary metal-oxide semiconductor (CMOS) sensor. The solid state image pickup element 110 is configured to receive an object image formed by the zoom lens system 101. Further, central processing units (CPUs) 111 and 122 control the driving of the camera body 124 and the zoom lens system 101, respectively. By applying the zoom lens system according to each embodiment of the present invention to a television camera as described above, an image pickup apparatus having a high optical performance may be implemented.

Hereinafter, Numerical Embodiment 1, corresponding to Embodiment 1 of the present invention, is described. In each of the numerical embodiments, "i" denotes the order of a surface from the object side, "ri" denotes a radius of curvature of an i-th surface from the object side, "di" denotes an interval between the i-th surface and the (i+1)th surface from the object side, and "ndi" and "vdi" respectively denote a refractive index and an Abbe number of the i-th optical material. As the focal length, the F-number, and the field angle, values obtained during focusing on an infinitely-distant object are described. "BF" denotes an air-equivalent back focus. Three surfaces closest to the image side are a glass block, such as a filter. The aspheric shape is expressed in the following expression where an X axis corresponds to the optical axis, an H axis corresponds to an axis perpendicular to the optical axis, a travelling direction of light corresponds to a positive direction, "R" denotes a paraxial radius of curvature, "k" denotes a conic coefficient, and each of "A4", "A6", and "A8" denotes an aspheric coefficient. Further, "e-Z" denotes "×10⁻ᶻ". Corresponding values between Conditional Expressions (1) to (7), (20) to (24), and (34) and the respective numerical embodiments are shown in Table 1.

$$X = \frac{H^2/R}{1+\sqrt{1-(1+k)(H/R)^2}} + A4H^4 + A6H^6 + A8H^8$$

Numerical Embodiment 1

| Surface Number | r | d | nd | vd | θgF | Effective diameter | Focal length | Specific gravity |
|---|---|---|---|---|---|---|---|---|
| 1 | 13126.78386 | 6.00000 | 1.834000 | 37.16 | 0.5775 | 194.297 | −427.550 | 4.43 |
| 2 | 349.23049 | 2.00000 | 1.000000 | 0.00 | 0.0000 | 189.672 | 0.000 | |
| 3 | 349.23049 | 25.50282 | 1.433870 | 95.10 | 0.5373 | 190.730 | 493.998 | 3.18 |
| 4 | −546.12372 | 21.13862 | 1.000000 | 0.00 | 0.0000 | 191.304 | 0.000 | |
| 5 | 332.97759 | 20.41429 | 1.433870 | 95.10 | 0.5373 | 194.094 | 642.135 | 3.18 |
| 6 | −1700.49807 | 0.25000 | 1.000000 | 0.00 | 0.0000 | 193.647 | 0.000 | |
| 7 | 280.68012 | 18.30426 | 1.433870 | 95.10 | 0.5373 | 188.770 | 692.758 | 3.18 |
| 8 | 4016.26759 | 0.25000 | 1.000000 | 0.00 | 0.0000 | 187.583 | 0.000 | |
| 9 | 163.31805 | 16.20661 | 1.438750 | 94.99 | 0.5342 | 174.290 | 714.824 | 3.62 |
| 10 | 329.54028 | (Variable) | 1.00000 | 0.00 | 0.0000 | 172.423 | 0.000 | |
| 11 | 2039.48287 | 2.00000 | 2.003300 | 28.30 | 0.5980 | 41.829 | −43.963 | 5.23 |
| 12 | 43.50671 | 7.60062 | 1.000000 | 0.00 | 0.0000 | 37.318 | 0.000 | |
| 13 | −63.56307 | 2.00000 | 1.882997 | 40.76 | 0.5667 | 37.391 | −30.772 | 5.52 |
| 14 | 48.65332 | 10.39620 | 1.922860 | 18.90 | 0.6495 | 40.653 | 32.163 | 3.58 |
| 15 | −70.47371 | 1.39481 | 1.000000 | 0.00 | 0.0000 | 41.549 | 0.000 | |
| 16 | −56.93730 | 2.00000 | 1.882997 | 40.76 | 0.5667 | 41.577 | −62.788 | 5.52 |
| 17* | 2752.83143 | (Variable) | 1.000000 | 0.00 | 0.0000 | 43.858 | 0.000 | |
| 18 | 110.71865 | 12.04739 | 1.487490 | 70.23 | 0.5300 | 82.705 | 220.491 | 2.46 |
| 19* | −4017.34203 | 0.20000 | 1.000000 | 0.00 | 0.0000 | 83.412 | 0.000 | |
| 20 | 100.82507 | 14.56409 | 1.592010 | 67.02 | 0.5357 | 86.273 | 139.821 | 3.14 |
| 21 | −446.35300 | 0.20000 | 1.000000 | 0.00 | 0.0000 | 85.783 | 0.000 | |
| 22 | 126.36755 | 2.50000 | 1.902050 | 25.10 | 0.6117 | 82.108 | −134.581 | 3.64 |
| 23 | 61.62355 | 20.34015 | 1.438750 | 94.99 | 0.5342 | 77.166 | 119.530 | 3.62 |
| 24 | −321.98550 | 0.20000 | 1.000000 | 0.00 | 0.0000 | 76.147 | 0.000 | |
| 25* | 99.28922 | 9.10082 | 1.487490 | 70.23 | 0.5300 | 72.714 | 193.721 | 2.46 |
| 26 | −2013.87176 | (Variable) | 1.000000 | 0.00 | 0.0000 | 71.208 | 0.000 | |
| 27 | 0.00000 | 2.26339 | 1.000000 | 0.00 | 0.0000 | 33.102 | 0.000 | |
| 28 | −267.02462 | 1.40000 | 1.816000 | 46.62 | 0.5568 | 31.872 | −33.941 | 5.07 |
| 29 | 31.15050 | 0.20000 | 1.000000 | 0.00 | 0.0000 | 30.117 | 0.000 | |
| 30 | 29.66362 | 5.93915 | 1.846660 | 23.78 | 0.6205 | 30.286 | 44.717 | 3.54 |
| 31 | 120.11267 | 6.93796 | 1.000000 | 0.00 | 0.0000 | 29.335 | 0.000 | |
| 32 | −53.21720 | 1.40000 | 1.882997 | 40.76 | 0.5667 | 27.426 | −86.207 | 5.52 |
| 33 | −176.68051 | 3.39956 | 1.000000 | 0.00 | 0.0000 | 27.493 | 0.000 | |
| 34 | −50.37470 | 1.80000 | 1.754998 | 52.32 | 0.5476 | 27.306 | −40.380 | 4.40 |
| 35 | 79.32177 | 3.13915 | 1.846660 | 23.78 | 0.6205 | 28.246 | 182.350 | 3.54 |
| 36 | 158.52232 | 3.03000 | 1.000000 | 0.00 | 0.0000 | 28.650 | 0.000 | |
| 37 | 0.00000 | 17.05480 | 1.620411 | 60.29 | 0.5426 | 29.764 | 113.609 | 3.59 |
| 38 | −70.76337 | 5.67752 | 1.000000 | 0.00 | 0.0000 | 34.009 | 0.000 | |
| 39 | 1337.70451 | 6.61715 | 1.487490 | 70.23 | 0.5300 | 35.220 | 94.702 | 2.46 |
| 40 | −47.90718 | 0.20000 | 1.000000 | 0.00 | 0.0000 | 35.512 | 0.000 | |
| 41 | 319.44763 | 1.60000 | 1.882997 | 40.76 | 0.5667 | 34.464 | −47.937 | 5.52 |
| 42 | 37.47929 | 10.11928 | 1.487490 | 70.23 | 0.5300 | 33.513 | 47.068 | 2.46 |
| 43 | −54.39529 | 0.20000 | 1.000000 | 0.00 | 0.0000 | 33.607 | 0.000 | |
| 44 | 373.09953 | 8.43170 | 1.567322 | 42.80 | 0.5730 | 32.682 | 47.242 | 2.57 |
| 45 | −28.80948 | 1.60000 | 1.882997 | 40.76 | 0.5667 | 31.991 | −32.378 | 5.52 |
| 46 | 16014.69149 | 0.20000 | 1.000000 | 0.00 | 0.0000 | 32.335 | 0.000 | |
| 47 | 63.58274 | 8.00061 | 1.487490 | 70.23 | 0.5300 | 32.573 | 56.468 | 2.46 |
| 48 | −46.81734 | 14.00000 | 1.000000 | 0.00 | 0.0000 | 32.256 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.516330 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004   A4 = −3.70721e−007   A6 = −2.42750e−010
A8 = 2.80767e−013

Nineteenth surface

K = 5.22565e+003   A4 = −1.12605e−008   A6 = 8.18017e−011
A8 = −4.29759e−015

Twenty-fifth surface

K = −5.12109e−001   A4 = −7.37630e−007   A6 = −6.26418e−011
A8 = −9.73848e−015

-continued

Various data
Zoom ratio 100.00

|  | Wide angle | Intermediate | Telephoto |
|---|---|---|---|
| Focal Length | 9.30 | 351.12 | 930.00 |
| F number | 1.85 | 1.85 | 4.90 |
| Field angle | 30.60 | 0.90 | 0.34 |
| Image height | 5.50 | 5.50 | 5.50 |
| Total lens length | 624.41 | 624.41 | 624.41 |
| BF | 12.00 | 12.00 | 12.00 |
| d10 | 3.09 | 168.18 | 177.68 |
| d17 | 262.30 | 44.50 | 3.95 |
| d26 | 3.00 | 55.71 | 86.76 |
| d51 | 12.00 | 12.00 | 12.00 |
| Entrance pupil position | 123.74 | 2940.12 | 10364.59 |
| Exit pupil position | 448.99 | 448.99 | 448.99 |
| Front principal point position | 133.24 | 3573.36 | 13273.80 |
| Rear principal point position | 2.70 | −339.12 | −918.00 |

Zoom lens unit data

| Unit | First surface | Focal Length | Lens structure length | Front principal point position | Rear principal point position |
|---|---|---|---|---|---|
| 1 | 1 | 237.80 | 110.07 | 60.15 | −20.18 |
| 2 | 11 | −23.70 | 25.39 | 4.74 | −11.59 |
| 3 | 18 | 64.00 | 59.15 | 16.96 | −26.25 |
| 4 | 27 | 52.83 | 149.41 | 60.31 | 23.45 |

|  | Wide angle | Intermediate | Telephoto |
|---|---|---|---|
| β2 | −0.1274 | −1.1278 | −2.0589 |
| β3 | −0.2524 | −1.0760 | −1.5611 |
| β4 | 1.2167 | 1.2167 | 1.2167 |

Numerical Embodiment 2

| Surface Number | r | d | nd | vd | θgF | Effective diameter | Focal length | Specific gravity |
|---|---|---|---|---|---|---|---|---|
| 1 | −59209.87234 | 6.00000 | 1.834000 | 37.16 | 0.5775 | 190.520 | −413.194 | 4.43 |
| 2 | 348.86239 | 2.00000 | 1.000000 | 0.00 | 0.0000 | 189.824 | 0.000 |  |
| 3 | 348.78552 | 26.26582 | 1.433870 | 95.10 | 0.5373 | 190.927 | 479.337 | 3.18 |
| 4 | −506.50514 | 19.75004 | 1.000000 | 0.00 | 0.0000 | 191.546 | 0.000 |  |
| 5 | 345.41442 | 19.98864 | 1.433870 | 95.10 | 0.5373 | 194.392 | 658.985 | 3.18 |
| 6 | −1654.74923 | 0.25000 | 1.000000 | 0.00 | 0.0000 | 193.975 | 0.000 |  |
| 7 | 250.55070 | 20.31789 | 1.433870 | 95.10 | 0.5373 | 188.790 | 615.806 | 3.18 |
| 8 | 3783.83048 | 0.25000 | 1.000000 | 0.00 | 0.0000 | 187.557 | 0.000 |  |
| 9 | 160.05543 | 16.24182 | 1.438750 | 94.99 | 0.5342 | 173.405 | 706.090 | 3.62 |
| 10 | 320.01220 | (Variable) | 1.000000 | 0.00 | 0.0000 | 171.516 | 0.000 |  |
| 11 | 2200.92214 | 2.00000 | 2.003300 | 28.30 | 0.5980 | 41.207 | −42.351 | 5.23 |
| 12 | 42.00926 | 7.68885 | 1.000000 | 0.00 | 0.0000 | 37.330 | 0.000 |  |
| 13 | −64.66888 | 2.00000 | 1.882997 | 40.76 | 0.566 | 37.406 | −30.041 | 5.52 |
| 14 | 46.08164 | 10.69387 | 1.922860 | 18.90 | 0.6495 | 40.778 | 31.347 | 3.58 |
| 15 | −71.35208 | 1.54288 | 1.000000 | 0.00 | 0.0000 | 41.678 | 0.000 |  |
| 16 | −55.60701 | 2.00000 | 1.882997 | 40.76 | 0.5667 | 41.710 | 61.478 | 5.52 |
| 17* | 3069.16685 | (Variable) | 1.000000 | 0.00 | 0.0000 | 44.113 | 0.000 |  |
| 18 | 110.25935 | 11.88790 | 1.487490 | 70.23 | 0.5300 | 81.598 | 219.821 | 2.46 |
| 19* | −4181.77385 | 0.20000 | 1.000000 | 0.00 | 0.0000 | 82.364 | 0.000 |  |
| 20 | 99.22849 | 14.51011 | 1.592010 | 67.02 | 0.5357 | 85.427 | 137.778 | 3.14 |
| 21 | −442.09371 | 0.20000 | 1.000000 | 0.00 | 0.0000 | 84.963 | 0.000 |  |
| 22 | 111.45159 | 2.50000 | 1.902000 | 25.10 | 0.6117 | 81.126 | −131.512 | 3.64 |
| 23 | 57.10610 | 20.81245 | 1.438750 | 94.99 | 0.5342 | 75.835 | 114.131 | 3.62 |
| 24 | −368.94975 | 0.20000 | 1.000000 | 0.00 | 0.0000 | 74.804 | 0.000 |  |
| 25* | 92.42966 | 9.41442 | 1.487490 | 70.23 | 0.5300 | 71.485 | 180.933 | 2.46 |
| 26 | −2013.64145 | (Variable) | 1.000000 | 0.00 | 0.0000 | 69.946 | 0.000 |  |
| 27 | 0.00000 | 2.56087 | 1.000000 | 0.00 | 0.0000 | 31.971 | 0.000 |  |
| 28 | −157.95515 | 1.40000 | 1.816000 | 46.62 | 0.5568 | 30.694 | −30.850 | 5.07 |
| 29 | 30.24880 | 0.20000 | 1.000000 | 0.00 | 0.0000 | 29.078 | 0.000 |  |

-continued

| | | | | | | | | |
|---|---|---|---|---|---|---|---|---|
| 30 | 29.05671 | 5.88736 | 1.846660 | 23.78 | 0.6205 | 29.256 | 41.528 | 3.54 |
| 31 | 144.99676 | 6.72196 | 1.000000 | 0.00 | 0.0000 | 28.412 | 0.000 | |
| 32 | −50.20387 | 1.40000 | 1.882997 | 40.76 | 0.5667 | 26.602 | −64.455 | 5.52 |
| 33 | −413.49656 | 3.11596 | 1.000000 | 0.00 | 0.0000 | 26.731 | 0.000 | |
| 34 | −65.21705 | 1.80000 | 1.754998 | 52.32 | 0.5476 | 26.777 | −43.567 | 4.40 |
| 35 | 67.77384 | 3.34023 | 1.846660 | 23.78 | 0.6205 | 27.671 | 130.625 | 3.54 |
| 36 | 168.45074 | 3.03000 | 1.000000 | 0.00 | 0.0000 | 28.074 | 0.000 | |
| 37 | 0.00000 | 17.58420 | 1.620411 | 60.29 | 0.5426 | 29.186 | 86.561 | 3.59 |
| 38 | −53.91582 | 5.63638 | 1.000000 | 0.00 | 0.0000 | 33.313 | 0.000 | |
| 39 | 1038.17812 | 5.88160 | 1.487490 | 70.23 | 0.5300 | 33.72 | 106.153 | 2.46 |
| 40 | −54.55673 | 0.20000 | 1.000000 | 0.00 | 0.0000 | 33.793 | 0.000 | |
| 41 | −274.77439 | 1.60000 | 1.882997 | 40.76 | 0.5667 | 33.088 | −36.502 | 5.52 |
| 42 | 36.85598 | 10.61465 | 1.487490 | 70.23 | 0.5300 | 32.513 | 42.786 | 2.46 |
| 43 | −43.84688 | 0.20000 | 1.000000 | 0.00 | 0.0000 | 33.021 | 0.000 | |
| 44 | 264.19125 | 8.15403 | 1.567322 | 42.80 | 0.5730 | 32.276 | 47.826 | 2.57 |
| 45 | −30.08421 | 1.60000 | 1.882997 | 40.76 | 0.5667 | 31.759 | −34.950 | 5.52 |
| 46 | −1000.32815 | 0.20000 | 1.000000 | 0.00 | 0.0000 | 32.208 | 0.000 | |
| 47 | 57.42703 | 8.08317 | 1.487490 | 70.23 | 0.5300 | 32.509 | 55.335 | 2.46 |
| 48 | −48.83156 | 14.00000 | 1.000000 | 0.00 | 0.0000 | 32.153 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.516330 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004   A4 = −4.62067e−007   A6 = −2.00582e−010
A8 = 2.43884e−013

Nineteenth surface

K = 5.22565e+003   A4 = −4.02846e−008   A6 = 9.92927e−011
A8 = −6.38338e−015

Twenty-fifth surface

K = 2.60804e−001   A4 = −9.02514e−007   A6 = −6.49789e−011
A8 = −1.22294e−014

Various data
Zoom ratio 100.00

| | Wide angle | Intermediate | Telephoto |
|---|---|---|---|
| Focal Length | 9.30 | 351.12 | 930.00 |
| F number | 1.85 | 1.85 | 4.90 |
| Field angle | 30.60 | 0.90 | 0.34 |
| Image height | 5.50 | 5.50 | 5.50 |
| Total lens length | 614.76 | 614.76 | 614.76 |
| BF | 12.00 | 12.00 | 12.00 |
| d10 | 2.59 | 160.94 | 170.04 |
| d17 | 251.05 | 41.38 | 2.05 |
| d26 | 3.00 | 54.32 | 84.55 |
| d51 | 12.00 | 12.00 | 12.00 |
| Entrance pupil position | 122.85 | 2912.07 | 10469.89 |
| Exit pupil position | 324.42 | 324.42 | 324.42 |
| Front principal point position | 132.43 | 3657.81 | 4168.28 |
| Rear principal point position | 2.70 | −339.12 | −918.00 |

Zoom lens unit data

| Unit | First surface | Focal Length | Lens structure length | Front principal point position | Rear principal point position |
|---|---|---|---|---|---|
| 1 | 1 | 229.37 | 111.06 | 59.82 | −20.58 |
| 2 | 11 | −22.90 | 25.93 | 4.83 | −11.75 |
| 3 | 18 | 62.00 | 59.72 | 17.20 | −26.57 |
| 4 | 27 | 48.37 | 149.41 | 57.65 | 23.74 |

| | Wide angle | Intermediate | Telephoto |
|---|---|---|---|
| β2 | −0.1283 | −1.1384 | −2.0786 |
| β3 | −0.2542 | −1.0820 | −1.5696 |
| β4 | 1.2428 | 1.2428 | 1.2428 |

Numerical Embodiment 3

| Surface Number | r | d | nd | vd | θgF | Effective diameter | Focal length | Specific gravity |
|---|---|---|---|---|---|---|---|---|
| 1 | 8580.34670 | 6.00000 | 1.834000 | 37.16 | 0.5775 | 217.612 | −477.763 | 4.43 |
| 2 | 382.97159 | 2.00000 | 1.000000 | 0.00 | 0.0000 | 210.440 | 0.000 | |
| 3 | 382.97159 | 28.66209 | 1.433870 | 95.10 | 0.5373 | 210.296 | 521.870 | 3.18 |
| 4 | −544.68674 | 25.54250 | 1.000000 | 0.00 | 0.0000 | 209.456 | 0.000 | |
| 5 | 364.55951 | 17.46964 | 1.433870 | 95.10 | 0.5373 | 197.157 | 797.717 | 3.18 |
| 6 | −7088.91418 | 0.25000 | 1.000000 | 0.00 | 0.0000 | 195.795 | 0.000 | |
| 7 | 271.44130 | 18.85337 | 1.433870 | 95.10 | 0.5373 | 191.749 | 693.827 | 3.18 |
| 8 | 2642.65310 | 0.25000 | 1.000000 | 0.00 | 0.0000 | 190.588 | 0.000 | |
| 9 | 193.28776 | 14.65064 | 1.433870 | 95.10 | 0.5373 | 179.870 | 848.616 | 3.62 |
| 10 | 396.44818 | (Variable) | 1.000000 | 0.00 | 0.0000 | 178.134 | 0.000 | |
| 11 | 484.50183 | 2.00000 | 2.003300 | 28.30 | 0.5980 | 46.261 | −43.419 | 5.23 |
| 12 | 40.19154 | 10.29951 | 1.000000 | 0.00 | 0.0000 | 40.308 | 0.000 | |
| 13 | −47.28761 | 2.00000 | 1.654115 | 39.70 | 0.5737 | 40.050 | −44.343 | 3.02 |
| 14 | 77.47528 | 8.85799 | 1.945950 | 17.98 | 0.6545 | 41.781 | 38.112 | 3.58 |
| 15 | −65.22154 | 1.27003 | 1.000000 | 0.00 | 0.0000 | 42.506 | 0.000 | |
| 16 | −55.49055 | 2.00000 | 1.882997 | 40.76 | 0.5667 | 42.465 | −61.668 | 5.52 |
| 17* | 4289.37254 | (Variable) | 1.000000 | 0.00 | 0.0000 | 44.607 | 0.000 | |
| 18 | 107.30400 | 12.85683 | 1.487490 | 70.23 | 0.5300 | 86.223 | 213.491 | 2.46 |
| 19* | −3743.62924 | 0.20000 | 1.000000 | 0.00 | 0.0000 | 86.632 | 0.000 | |
| 20 | 96.90173 | 15.41719 | 1.592010 | 67.02 | 0.5357 | 88.625 | 140.483 | 3.14 |
| 21 | −566.18035 | 0.20000 | 1.000000 | 0.00 | 0.0000 | 87.838 | 0.000 | |
| 22 | 122.88192 | 2.50000 | 1.902000 | 25.10 | 0.6117 | 83.006 | −137.995 | 3.64 |
| 23 | 61.52059 | 20.35818 | 1.438750 | 94.99 | 0.5342 | 77.447 | 121.724 | 3.62 |
| 24 | −371.03769 | 0.20000 | 1.000000 | 0.00 | 0.0000 | 75.887 | 0.000 | |
| 25* | 209.60689 | 5.45536 | 1.487490 | 70.23 | 0.5300 | 73.614 | 402.027 | 2.46 |
| 26 | −3154.16041 | (Variable) | 1.000000 | 0.00 | 0.0000 | 72.252 | 0.000 | |
| 27 | 0.00000 | 1.95542 | 1.000000 | 0.00 | 0.0000 | 34.366 | 0.000 | |
| 28 | −718.56251 | 1.40000 | 1.816000 | 46.62 | 0.5568 | 33.308 | −36.686 | 5.07 |
| 29 | 31.43087 | 0.20000 | 1.000000 | 0.00 | 0.0000 | 31.569 | 0.000 | |
| 30 | 29.24862 | 6.25947 | 1.846660 | 23.78 | 0.6205 | 31.855 | 46.377 | 3.54 |
| 31 | 100.46675 | 7.16625 | 1.000000 | 0.00 | 0.0000 | 30.838 | 0.000 | |
| 32 | −61.07095 | 1.40000 | 1.882997 | 40.76 | 0.5667 | 29.041 | −724.860 | 5.52 |
| 33 | −68.19904 | 2.95395 | 1.000000 | 0.00 | 0.0000 | 29.065 | 0.000 | |
| 34 | −42.98928 | 1.80000 | 1.754998 | 52.32 | 0.5476 | 28.274 | −70.790 | 4.40 |
| 35 | −219.59227 | 2.10751 | 1.846660 | 23.78 | 0.6205 | 28.641 | −315.949 | 3.54 |
| 36 | −1178.57759 | 3.03000 | 1.000000 | 0.00 | 0.0000 | 28.890 | 0.000 | |
| 37 | 0.00000 | 14.35913 | 1.620411 | 60.29 | 0.5426 | 29.405 | −193.162 | 3.59 |
| 38 | 120.31398 | 6.51006 | 1.000000 | 0.00 | 0.0000 | 30.966 | 0.000 | |
| 39 | 145.74489 | 7.98727 | 1.487490 | 70.23 | 0.5300 | 33.120 | 66.065 | 2.46 |
| 40 | −40.77477 | 0.20000 | 1.000000 | 0.00 | 0.0000 | 33.615 | 0.000 | |
| 41 | −160.64933 | 1.60000 | 1.882997 | 40.76 | 0.5667 | 32.926 | −50.544 | 5.52 |
| 42 | 62.58994 | 9.63935 | 1.487490 | 70.23 | 0.5300 | 32.814 | 53.614 | 2.46 |
| 43 | −42.85503 | 0.20000 | 1.000000 | 0.00 | 0.0000 | 33.288 | 0.000 | |
| 44 | 547.03292 | 8.55933 | 1.567322 | 42.80 | 0.5730 | 32.353 | 46.493 | 2.57 |
| 45 | −27.71566 | 1.60000 | 1.882997 | 40.76 | 0.5667 | 31.764 | −38.186 | 5.52 |
| 46 | −155.75180 | 0.20000 | 1.000000 | 0.00 | 0.0000 | 32.290 | 0.000 | |
| 47 | 52.60857 | 7.24608 | 1.487490 | 70.23 | 0.5300 | 32.245 | 64.799 | 2.46 |
| 48 | −76.12896 | 14.00000 | 1.000000 | 0.00 | 0.0000 | 31.580 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.516330 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004    A4 = −4.02985e−007    A6 = −4.14640e−011
A8 = 1.18046e−013

Nineteenth surface

K = 5.22565e+003    A4 = 1.22787e−007    A6 = 6.42331e−012
A8 = −4.29759e−015

Twenty-fifth surface

K = −3.42181e+000    A4 = −6.47439e−007    A6 = −1.21058e−010
A8 = 4.63506e−015

Various data
Zoom ratio 120.00

| | Wide angle | Intermediate | Telephoto |
|---|---|---|---|

-continued

|  |  |  |  |
|---|---|---|---|
| Focal Length | 9.00 | 356.79 | 1080.00 |
| F number | 1.85 | 1.85 | 5.60 |
| Field angle | 31.43 | 0.88 | 0.29 |
| Image height | 5.50 | 5.50 | 5.50 |
| Total lens length | 663.94 | 663.94 | 663.94 |
| BF | 12.00 | 12.00 | 12.00 |
| d10 | 3.36 | 190.13 | 201.50 |
| d17 | 301.71 | 54.46 | 1.63 |
| d26 | 3.00 | 63.47 | 104.94 |
| d51 | 12.00 | 12.00 | 12.00 |
| Entrance pupil position | 130.16 | 3283.45 | 14387.39 |
| Exit pupil position | 530.76 | 530.76 | 530.76 |
| Front principal point position | 3885.62 | 17715.83 | 139.31 |
| Rear principal point position | 3.00 | 344.79 | 1068.00 |

Zoom lens unit data

| Unit | First surface | Focal Length | Lens structure length | Front principal point position | Rear principal point position |
|---|---|---|---|---|---|
| 1 | 1 | 263.71 | 113.68 | 64.95 | −19.34 |
| 2 | 11 | −26.50 | 26.43 | 4.80 | −13.26 |
| 3 | 18 | 72.00 | 57.19 | 13.11 | −27.56 |
| 4 | 27 | 56.43 | 146.57 | 63.38 | 16.09 |

|  | Wide angle | Intermediate | Telephoto |
|---|---|---|---|
| β2 | −0.1264 | −1.1555 | −2.2896 |
| β3 | −0.2518 | −1.0917 | −1.6677 |
| β4 | 1.0726 | 1.0726 | 1.0726 |

Numerical Embodiment 4

| Surface Number | r | d | nd | vd | θgF | Effective diameter | Focal length | Specific gravity |
|---|---|---|---|---|---|---|---|---|
| 1 | −11085.52629 | 6.00000 | 1.834000 | 37.16 | 0.5775 | 205.125 | −422.466 | 4.43 |
| 2 | 366.39224 | 2.00000 | 1.000000 | 0.00 | 0.0000 | 197.981 | 0.000 |  |
| 3 | 366.33521 | 27.00702 | 1.433870 | 95.10 | 0.5373 | 197.616 | 495.492 | 3.18 |
| 4 | −511.80109 | 21.17174 | 1.000000 | 0.00 | 0.0000 | 196.448 | 0.000 |  |
| 5 | 372.20232 | 19.83982 | 1.433870 | 95.10 | 0.5373 | 197.905 | 685.940 | 3.18 |
| 6 | −1479.50066 | 0.25000 | 1.000000 | 0.00 | 0.0000 | 197.533 | 0.000 |  |
| 7 | 245.68034 | 20.46217 | 1.433870 | 95.10 | 0.5373 | 192.222 | 630.509 | 3.18 |
| 8 | 2299.11088 | 0.25000 | 1.000000 | 0.00 | 0.0000 | 191.042 | 0.000 |  |
| 9 | 168.82452 | 16.31057 | 1.433870 | 95.10 | 0.5373 | 177.785 | 727.609 | 3.62 |
| 10 | 351.25507 | (Variable) | 1.000000 | 0.00 | 0.0000 | 176.105 | 0.000 |  |
| 11 | 601.98699 | 1.81818 | 2.003300 | 28.30 | 0.5980 | 43.832 | −38.291 | 5.23 |
| 12 | 36.34175 | 8.31150 | 1.000000 | 0.00 | 0.0000 | 37.983 | 0.000 |  |
| 13 | −66.04016 | 1.81818 | 1.654115 | 39.70 | 0.5737 | 37.887 | −37.497 | 3.02 |
| 14 | 39.82221 | 9.95263 | 1.945950 | 17.98 | 0.6545 | 41.447 | 32.763 | 3.58 |
| 15 | −130.21287 | 3.20252 | 1.000000 | 0.00 | 0.0000 | 41.779 | 0.000 |  |
| 16 | −52.95646 | 1.81818 | 1.882997 | 40.76 | 0.5667 | 41.752 | −58.376 | 5.52 |
| 17* | 2514.09614 | (Variable) | 1.000000 | 0.00 | 0.0000 | 44.048 | 0.000 |  |
| 18 | 110.19527 | 12.38646 | 1.487490 | 70.23 | 0.5300 | 86.358 | 218.931 | 2.46 |
| 19* | −3659.27977 | 0.18378 | 1.000000 | 0.00 | 0.0000 | 86.972 | 0.000 |  |
| 20 | 101.36322 | 15.58187 | 1.592010 | 67.02 | 0.5357 | 90.039 | 138.934 | 3.14 |
| 21 | −419.10578 | 0.18378 | 1.000000 | 0.00 | 0.0000 | 89.538 | 0.000 |  |
| 22 | 72.55330 | 2.29730 | 1.902000 | 25.10 | 0.6117 | 82.665 | −134.082 | 3.64 |
| 23 | 44.82067 | 25.61434 | 1.438750 | 94.99 | 0.5342 | 74.610 | 95.797 | 3.62 |
| 24 | −580.79754 | 0.18378 | 1.000000 | 0.00 | 0.0000 | 73.026 | 0.000 |  |
| 25* | 181.22978 | 6.03769 | 1.487490 | 70.23 | 0.5300 | 70.888 | 345.294 | 2.46 |
| 26 | −2455.34903 | (Variable) | 1.000000 | 0.00 | 0.0000 | 69.375 | 0.000 |  |
| 27 | 0.00000 | 2.23386 | 1.000000 | 0.00 | 0.0000 | 30.698 | 0.000 |  |
| 28 | −243.48684 | 1.40000 | 1.816000 | 46.62 | 0.5568 | 29.458 | −29.216 | 5.07 |
| 29 | 26.64673 | 0.20000 | 1.000000 | 0.00 | 0.0000 | 27.701 | 0.000 |  |
| 30 | 25.99101 | 5.62244 | 1.846660 | 23.78 | 0.6205 | 27.873 | 40.300 | 3.54 |
| 31 | 95.22679 | 7.03139 | 1.000000 | 0.00 | 0.0000 | 26.997 | 0.000 |  |
| 32 | −44.06688 | 1.40000 | 1.882997 | 40.76 | 0.5667 | 25.323 | −49.100 | 5.52 |
| 33 | 4251.06997 | 3.17771 | 1.000000 | 0.00 | 0.0000 | 25.589 | 0.000 |  |
| 34 | −71.61515 | 1.80000 | 1.754998 | 52.32 | 0.5476 | 25.904 | −70.470 | 4.40 |

-continued

| | | | | | | | | |
|---|---|---|---|---|---|---|---|---|
| 35 | 212.95699 | 3.37045 | 1.846660 | 23.78 | 0.6205 | 26.750 | 120.407 | 3.54 |
| 36 | −197.85090 | 3.03000 | 1.000000 | 0.00 | 0.0000 | 27.317 | 0.000 | |
| 37 | 0.00000 | 15.53311 | 1.620411 | 60.29 | 0.5426 | 28.392 | 351.927 | 3.59 |
| 38 | −219.20299 | 5.66968 | 1.000000 | 0.00 | 0.0000 | 31.204 | 0.000 | |
| 39 | 174.52518 | 6.71463 | 1.487490 | 70.23 | 0.5300 | 32.714 | 78.283 | 2.46 |
| 40 | −48.43461 | 0.20000 | 1.000000 | 0.00 | 0.0000 | 32.964 | 0.000 | |
| 41 | −387.96155 | 1.60000 | 1.882997 | 40.76 | 0.5667 | 32.308 | −36.672 | 5.52 |
| 42 | 35.62364 | 10.67940 | 1.487490 | 70.23 | 0.5300 | 31.820 | 40.866 | 2.46 |
| 43 | −41.06364 | 0.20000 | 1.000000 | 0.00 | 0.0000 | 32.400 | 0.000 | |
| 44 | 1254.75269 | 8.17618 | 1.567322 | 42.80 | 0.5730 | 31.744 | 46.655 | 2.57 |
| 45 | −27.12766 | 1.60000 | 1.882997 | 40.76 | 0.5667 | 31.361 | −35.540 | 5.52 |
| 46 | −198.34409 | 0.20000 | 1.000000 | 0.00 | 0.0000 | 32.161 | 0.000 | |
| 47 | 57.86726 | 8.08513 | 1.487490 | 70.23 | 0.5300 | 32.511 | 55.536 | 2.46 |
| 48 | −48.85200 | 14.00000 | 1.000000 | 0.00 | 0.0000 | 32.152 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.516330 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004    A 4 = 4.56143e−008    A 6 = −4.01855e−010
A 8 = 5.83466e−013

Nineteenth surface

K = 5.22565e+003    A 4 = 7.56908e−008    A 6 = 4.43142e−011
A 8 = 5.81615e−015

Twenty-fifth surface

K = 7.06928e−001    A 4 = −7.97058e−007    A 6 = −3.06932e−011
A 8 = 5.53078e−014

Various data
Zoom ratio 120.00

| | Wide angle | Intermediate | Telephoto |
|---|---|---|---|
| Focal Length | 9.00 | 356.79 | 1080.00 |
| F number | 1.85 | 1.85 | 5.60 |
| Field angle | 31.43 | 0.88 | 0.29 |
| Image height | 5.50 | 5.50 | 5.50 |
| Total lens length | 635.21 | 635.21 | 635.21 |
| BF | 12.00 | 12.00 | 12.00 |
| d10 | 2.45 | 168.66 | 178.72 |
| d17 | 266.96 | 47.72 | 1.55 |
| d26 | 3.00 | 56.04 | 92.14 |
| d51 | 12.00 | 12.00 | 12.00 |
| Entrance pupil position | 125.04 | 3191.17 | 14549.27 |
| Exit pupil position | 244.67 | 244.67 | 244.67 |
| Front principal point position | 134.39 | 4095.05 | 20642.20 |
| Rear principal point position | 3.00 | −344.79 | −1068.00 |

Zoom lens unit data

| Unit | First surface | Focal Length | Lens structure length | Front principal point position | Rear principal point position |
|---|---|---|---|---|---|
| 1 | 1 | 237.46 | 113.29 | 62.30 | −19.91 |
| 2 | 11 | −23.00 | 26.92 | 5.64 | −11.59 |
| 3 | 18 | 64.00 | 62.47 | 14.86 | −30.18 |
| 4 | 27 | 44.10 | 148.12 | 54.98 | 21.94 |

| | Wide angle | Intermediate | Telephoto |
|---|---|---|---|
| β2 | −0.1234 | −1.1359 | −2.2583 |
| β3 | −0.2507 | −1.0794 | −1.6435 |
| β4 | 1.2254 | 1.2254 | 1.2254 |

Numerical Embodiment 5

| Surface Number | r | d | nd | vd | θgF | Effective diameter | Focal length | Specific gravity |
|---|---|---|---|---|---|---|---|---|
| 1 | 3465.41346 | 6.00000 | 1.834000 | 37.16 | 0.5775 | 191.463 | −440.266 | 4.43 |
| 2 | 333.65474 | 2.00000 | 1.000000 | 0.00 | 0.0000 | 189.336 | 0.000 | |
| 3 | 333.64931 | 25.72124 | 1.433870 | 95.10 | 0.5373 | 190.370 | 487.566 | 3.18 |
| 4 | −568.39576 | 21.03504 | 1.000000 | 0.00 | 0.0000 | 190.882 | 0.000 | |
| 5 | 313.19087 | 22.05808 | 1.433870 | 95.10 | 0.5373 | 192.939 | 580.108 | 3.18 |
| 6 | −1270.60981 | 0.25000 | 1.000000 | 0.00 | 0.0000 | 192.422 | 0.000 | |
| 7 | 317.23263 | 14.91691 | 1.433870 | 95.10 | 0.5373 | 186.975 | 864.116 | 3.18 |
| 8 | 2004.90927 | 0.25000 | 1.000000 | 0.00 | 0.0000 | 185.793 | 0.000 | |
| 9 | 156.02327 | 16.48994 | 1.438750 | 94.99 | 0.5342 | 172.838 | 692.004 | 3.62 |
| 10 | 309.77411 | (Variable) | 1.000000 | 0.00 | 0.0000 | 171.011 | 0.000 | |
| 11 | 2429.77564 | 2.00000 | 2.003300 | 28.30 | 0.5980 | 40.731 | −41.759 | 5.23 |
| 12 | 41.50811 | 8.06575 | 1.000000 | 0.00 | 0.0000 | 36.740 | 0.000 | |
| 13 | −53.36920 | 2.00000 | 1.882997 | 40.76 | 0.5667 | 36.824 | −30.453 | 5.52 |
| 14 | 55.80477 | 10.16634 | 1.922860 | 18.90 | 0.6495 | 40.741 | 33.443 | 3.58 |
| 15 | −64.74959 | 0.61902 | 1.000000 | 0.00 | 0.0000 | 41.866 | 0.000 | |
| 16 | −64.41432 | 2.00000 | 1.882997 | 40.76 | 0.5667 | 41.946 | −71.912 | 5.52 |
| 17* | 7648.51096 | (Variable) | 1.000000 | 0.00 | 0.0000 | 44.072 | 0.000 | |
| 18 | 105.62312 | 14.06584 | 1.487490 | 70.23 | 0.5300 | 83.347 | 210.913 | 2.46 |
| 19* | −4243.61225 | 0.20000 | 1.000000 | 0.00 | 0.0000 | 83.995 | 0.000 | |
| 20 | 125.34292 | 12.98092 | 1.592010 | 67.02 | 0.5357 | 85.210 | 158.026 | 3.14 |
| 21 | −359.66842 | 0.20000 | 1.000000 | 0.00 | 0.0000 | 84.659 | 0.000 | |
| 22 | 117.63224 | 18.28870 | 1.438750 | 94.99 | 0.5342 | 80.313 | 142.362 | 3.62 |
| 23 | −127.53362 | 2.50000 | 1.902000 | 25.10 | 0.6117 | 77.571 | −130.083 | 3.64 |
| 24 | 1675.96176 | 0.20000 | 1.000000 | 0.00 | 0.0000 | 75.623 | 0.000 | |
| 25* | 117.20223 | 10.91838 | 1.487490 | 70.23 | 0.5300 | 74.512 | 141.758 | 2.46 |
| 26 | −164.60190 | (Variable) | 1.000000 | 0.00 | 0.0000 | 73.523 | 0.000 | |
| 27 | 0.00000 | 2.47935 | 1.000000 | 0.00 | 0.0000 | 32.701 | 0.000 | |
| 28 | −183.60166 | 1.40000 | 1.816000 | 46.62 | 0.5568 | 31.460 | −39.490 | 5.07 |
| 29 | 39.46039 | 0.20000 | 1.000000 | 0.00 | 0.0000 | 30.051 | 0.000 | |
| 30 | 30.56562 | 4.70083 | 1.846660 | 23.78 | 0.6205 | 30.249 | 70.691 | 3.54 |
| 31 | 57.45166 | 7.97979 | 1.000000 | 0.00 | 0.0000 | 29.155 | 0.000 | |
| 32 | −51.30465 | 1.40000 | 1.882997 | 40.76 | 0.5667 | 27.726 | −285.248 | 5.52 |
| 33 | −65.15852 | 2.75518 | 1.000000 | 0.00 | 0.0000 | 27.887 | 0.000 | |
| 34 | −43.48347 | 1.80000 | 1.754998 | 52.32 | 0.5476 | 27.431 | −35.911 | 4.40 |
| 35 | 74.19712 | 3.39801 | 1.846660 | 23.78 | 0.6205 | 28.300 | 129.821 | 3.54 |
| 36 | 219.05273 | 3.03000 | 1.000000 | 0.00 | 0.0000 | 28.631 | 0.000 | |
| 37 | 0.00000 | 15.61666 | 1.620411 | 60.29 | 0.5426 | 29.564 | 342.468 | 3.59 |
| 38 | −213.31148 | 5.65252 | 1.000000 | 0.00 | 0.0000 | 32.892 | 0.000 | |
| 39 | 72.92018 | 8.29876 | 1.487490 | 70.23 | 0.5300 | 35.122 | 62.648 | 2.46 |
| 40 | −50.88084 | 0.20000 | 1.000000 | 0.00 | 0.0000 | 35.153 | 0.000 | |
| 41 | −347.91187 | 1.60000 | 1.882997 | 40.76 | 0.5667 | 34.096 | −39.534 | 5.52 |
| 42 | 39.13784 | 9.49801 | 1.487490 | 70.23 | 0.5300 | 33.279 | 50.843 | 2.46 |
| 43 | −62.78134 | 0.20000 | 1.000000 | 0.00 | 0.0000 | 33.521 | 0.000 | |
| 44 | 120.88971 | 9.23913 | 1.567322 | 42.80 | 0.5730 | 32.907 | 41.636 | 2.57 |
| 45 | −28.73870 | 1.60000 | 1.882997 | 40.76 | 0.5667 | 32.248 | −37.920 | 5.52 |
| 46 | −201.06047 | 0.20000 | 1.000000 | 0.00 | 0.0000 | 32.609 | 0.000 | |
| 47 | 87.03337 | 6.96646 | 1.487490 | 70.23 | 0.5300 | 32.540 | 68.847 | 2.46 |
| 48 | −53.48649 | 14.00000 | 1.000000 | 0.00 | 0.0000 | 32.113 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.51633 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004　　A4 = −4.72868e−007　　A6 = −1.22499e−010
A8 = 1.62487e−013

Nineteenth surface

K = 5.22565e+003　　A4 = −4.30663e−007　　A6 = 8.49630e−011
A8 = −7.32828e−015

Twenty-fifth surface

K = −6.95782e+000　　A4 = −1.05875e−006　　A6 = −5.07729e−011
A8 = 3.13718e−014

Various data
Zoom ratio 100.00

| | Wide angle | Intermediate | Telephoto |
|---|---|---|---|
| Focal Length | 9.30 | 351.12 | 930.00 |
| F number | 1.85 | 1.85 | 4.90 |
| Field angle | 30.60 | 0.90 | 0.34 |
| Image height | 5.50 | 5.50 | 5.50 |

-continued

|  |  |  |  |
|---|---|---|---|
| Total lens length | 621.45 | 621.45 | 621.45 |
| BF | 12.00 | 12.00 | 12.00 |
| d10 | 2.80 | 167.89 | 177.39 |
| d17 | 262.31 | 44.51 | 3.96 |
| d26 | 3.00 | 55.71 | 86.76 |
| d51 | 12.00 | 12.00 | 12.00 |
| Entrance pupil position | 122.13 | 2957.50 | 10496.34 |
| Exit pupil position | 413.05 | 413.05 | 413.05 |
| Front principal point position | 131.65 | 3616.04 | 13582.93 |
| Rear principal point position | 2.70 | −339.12 | −918.00 |

Zoom lens unit data

| Unit | First surface | Focal Length | Lens structure length | Front principal point position | Rear principal point position |
|---|---|---|---|---|---|
| 1 | 1 | 237.80 | 108.72 | 58.53 | −21.20 |
| 2 | 11 | −23.70 | 24.85 | 4.00 | −12.37 |
| 3 | 18 | 64.00 | 59.35 | 16.17 | −26.83 |
| 4 | 27 | 51.63 | 148.41 | 59.52 | 23.19 |

|  | Wide angle | Intermediate | Telephoto |
|---|---|---|---|
| β2 | −0.1274 | −1.1278 | −2.0589 |
| β3 | −0.2524 | −1.0760 | −1.5611 |
| β4 | 1.2167 | 1.2167 | 1.2167 |

Numerical Embodiment 6

| Surface Number | r | d | nd | vd | θgF | Effective diameter | Focal length | Specific gravity |
|---|---|---|---|---|---|---|---|---|
| 1 | 9111.42380 | 6.00000 | 1.834000 | 37.16 | 0.5775 | 193.818 | −431.345 | 4.43 |
| 2 | 348.09779 | 2.00000 | 1.000000 | 0.00 | 0.0000 | 189.618 | 0.000 |  |
| 3 | 348.01257 | 25.95137 | 1.433870 | 95.10 | 0.5373 | 190.668 | 484.076 | 3.18 |
| 4 | −521.02193 | 21.05000 | 1.000000 | 0.00 | 0.0000 | 191.230 | 0.000 |  |
| 5 | 325.33530 | 20.13574 | 1.433870 | 95.10 | 0.5373 | 193.504 | 649.256 | 3.18 |
| 6 | −2099.71067 | 0.25000 | 1.000000 | 0.00 | 0.0000 | 193.018 | 0.000 |  |
| 7 | 288.02074 | 18.35726 | 1.433870 | 95.10 | 0.5373 | 188.260 | 685.195 | 3.18 |
| 8 | 8408.28694 | 0.25000 | 1.000000 | 0.00 | 0.0000 | 187.072 | 0.000 |  |
| 9 | 158.00071 | 15.58909 | 1.438750 | 94.99 | 0.5342 | 172.884 | 744.664 | 3.62 |
| 10 | 296.04534 | (Variable) | 1.000000 | 0.00 | 0.0000 | 170.991 | 0.000 |  |
| 11 | 2068.27102 | 2.00000 | 2.003300 | 28.30 | 0.5980 | 41.702 | −44.567 | 5.23 |
| 12 | 44.10531 | 7.64468 | 1.000000 | 0.00 | 0.0000 | 37.292 | 0.000 |  |
| 13 | −60.92782 | 2.00000 | 1.882997 | 40.76 | 0.5667 | 37.355 | −29.906 | 5.52 |
| 14 | 47.81627 | 10.28087 | 1.922860 | 18.90 | 0.6495 | 40.739 | 32.755 | 3.58 |
| 15 | −76.17832 | 1.31939 | 1.000000 | 0.00 | 0.0000 | 41.648 | 0.000 |  |
| 16 | −61.72740 | 2.00000 | 1.882997 | 40.76 | 0.5667 | 41.706 | −68.050 | 5.52 |
| 17* | 2938.85616 | (Variable) | 1.000000 | 0.00 | 0.0000 | 43.858 | 0.000 |  |
| 18 | 111.34327 | 11.91354 | 1.487490 | 70.23 | 0.5300 | 82.119 | 221.864 | 2.46 |
| 19* | −4135.98790 | 0.20000 | 1.000000 | 0.00 | 0.0000 | 82.839 | 0.000 |  |
| 20 | 99.67066 | 14.71693 | 1.592010 | 67.02 | 0.5357 | 85.734 | 135.729 | 3.14 |
| 21 | −399.08964 | 0.20000 | 1.000000 | 0.00 | 0.0000 | 85.251 | 0.000 |  |
| 22 | 151.70802 | 2.50000 | 1.755199 | 27.51 | 0.6103 | 81.85 | −118.248 | 3.15 |
| 23 | 56.11190 | 20.94759 | 1.438750 | 94.99 | 0.5342 | 76.192 | 114.919 | 3.62 |
| 24 | −451.57607 | 0.20000 | 1.000000 | 0.00 | 0.0000 | 75.251 | 0.000 |  |
| 25* | 93.90748 | 9.56015 | 1.516330 | 64.14 | 0.5352 | 72.338 | 173.775 | 2.52 |
| 26 | −2121.24646 | (Variable) | 1.000000 | 0.00 | 0.0000 | 70.876 | 0.000 |  |
| 27 | 0.00000 | 2.45337 | 1.000000 | 0.00 | 0.0000 | 32.832 | 0.000 |  |
| 28 | −191.89609 | 1.40000 | 1.816000 | 46.62 | 0.5568 | 31.592 | −32.451 | 5.07 |
| 29 | 31.00310 | 0.20000 | 1.000000 | 0.00 | 0.0000 | 29.925 | 0.000 |  |
| 30 | 29.43529 | 5.94177 | 1.846660 | 23.78 | 0.6205 | 30.126 | 43.271 | 3.54 |
| 31 | 130.59418 | 6.90636 | 1.000000 | 0.00 | 0.0000 | 29.247 | 0.000 |  |
| 32 | −51.76144 | 1.40000 | 1.882997 | 40.76 | 0.5667 | 27.414 | −76.682 | 5.52 |
| 33 | −218.43908 | 3.16316 | 1.000000 | 0.00 | 0.0000 | 27.529 | 0.000 |  |
| 34 | −56.30013 | 1.80000 | 1.754998 | 52.32 | 0.5476 | 27.463 | −43.973 | 4.40 |
| 35 | 82.94718 | 3.13436 | 1.846660 | 23.78 | 0.6205 | 28.387 | 169.313 | 3.54 |
| 36 | 190.85497 | 3.03000 | 1.000000 | 0.00 | 0.0000 | 28.796 | 0.000 |  |
| 37 | 0.00000 | 17.03343 | 1.620411 | 60.29 | 0.5426 | 29.919 | 110.855 | 3.59 |
| 38 | −69.04745 | 5.58936 | 1.000000 | 0.00 | 0.0000 | 34.001 | 0.000 |  |

-continued

| | | | | | | | | |
|---|---|---|---|---|---|---|---|---|
| 39 | 692.82747 | 6.40706 | 1.487490 | 70.23 | 0.5300 | 35.039 | 96.466 | 2.46 |
| 40 | −50.48092 | 0.20000 | 1.000000 | 0.00 | 0.0000 | 35.252 | 0.000 | |
| 41 | 928.83015 | 1.60000 | 1.882997 | 40.76 | 0.5667 | 34.308 | −44.047 | 5.52 |
| 42 | 37.50891 | 10.37853 | 1.487490 | 70.23 | 0.5300 | 33.457 | 45.068 | 2.46 |
| 43 | −48.61244 | 0.20000 | 1.000000 | 0.00 | 0.0000 | 33.676 | 0.000 | |
| 44 | 244.83783 | 8.50113 | 1.567322 | 42.80 | 0.5730 | 32.642 | 45.679 | 2.57 |
| 45 | −28.79411 | 1.60000 | 1.882997 | 40.76 | 0.5667 | 31.945 | −31.341 | 5.52 |
| 46 | 857.69336 | 0.20000 | 1.000000 | 0.00 | 0.0000 | 32.248 | 0.000 | |
| 47 | 58.11531 | 8.07253 | 1.487490 | 70.23 | 0.5300 | 32.534 | 54.897 | 2.46 |
| 48 | −47.63938 | 14.00000 | 1.000000 | 0.00 | 0.0000 | 32.208 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.516330 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004   A4 = −3.15006e−007   A6 = −2.29632e−010
A8 = 2.78968e−013

Nineteenth surface

K = 5.22565e+003   A4 = −4.41285e−008   A6 = 8.96784e−011
A8 = −4.66673e−015

Twenty-fifth surface

K = −4.22445e−001   A4 = −6.93881e−007   A6 = −4.61837e−011
A8 = −6.27941e−015

Various data
Zoom ratio 100.00

| | Wide angle | Intermediate | Telephoto |
|---|---|---|---|
| Focal Length | 9.30 | 351.12 | 930.00 |
| F number | 0.00 | 0.00 | 0.00 |
| Field angle | 0.00 | 0.00 | 0.00 |
| Image height | 5.50 | 5.50 | 5.50 |
| Total lens length | 623.83 | 623.83 | 623.83 |
| BF | 12.00 | 12.00 | 12.00 |
| d10 | 2.63 | 167.72 | 177.23 |
| d17 | 261.72 | 43.92 | 3.37 |
| d26 | 3.00 | 55.71 | 86.76 |
| d51 | 12.00 | 12.00 | 12.00 |
| Entrance pupil position | 123.02 | 2952.13 | 10453.26 |
| Exit pupil position | 447.48 | 447.48 | 447.48 |
| Front principal point position | 132.52 | 3586.35 | 13369.35 |
| Rear principal point position | 2.70 | −339.12 | −918.00 |

Zoom lens unit data

| Unit | First surface | Focal Length | Lens structure length | Front principal point position | Rear principal point position |
|---|---|---|---|---|---|
| 1 | 1 | 237.80 | 109.58 | 59.42 | −20.64 |
| 2 | 11 | −23.70 | 25.24 | 4.72 | −11.58 |
| 3 | 18 | 64.00 | 60.24 | 17.56 | −26.64 |
| 4 | 27 | 52.45 | 149.41 | 59.85 | 23.37 |

| | Wide angle | Intermediate | Telephoto |
|---|---|---|---|
| β2 | −0.1274 | −1.1278 | −2.0589 |
| β3 | −0.2524 | −1.0760 | −1.5611 |
| β4 | 1.2167 | 1.2167 | 1.2167 |

60

Numerical Embodiment 7

| Surface | | | | | | Effective | Focal | Specific |
|---|---|---|---|---|---|---|---|---|

-continued

| Number | r | d | nd | vd | θgF | diameter | length | gravity |
|---|---|---|---|---|---|---|---|---|
| 1 | 11287.73845 | 6.00000 | 1.834000 | 37.16 | 0.5775 | 193.550 | −428.230 | 4.43 |
| 2 | 348.24758 | 2.00000 | 1.000000 | 0.00 | 0.0000 | 189.652 | 0.000 | |
| 3 | 348.23496 | 25.99798 | 1.433870 | 95.10 | 0.5373 | 190.709 | 483.233 | 3.18 |
| 4 | −518.21157 | 21.06680 | 1.000000 | 0.00 | 0.0000 | 191.279 | 0.000 | |
| 5 | 333.38357 | 19.40431 | 1.433870 | 95.10 | 0.5373 | 193.651 | 678.986 | 3.18 |
| 6 | −2541.82955 | 0.25000 | 1.000000 | 0.00 | 0.0000 | 193.185 | 0.000 | |
| 7 | 269.37484 | 19.55626 | 1.433870 | 95.10 | 0.5373 | 188.528 | 639.784 | 3.18 |
| 8 | 8232.05331 | 0.25000 | 1.000000 | 0.00 | 0.0000 | 187.329 | 0.000 | |
| 9 | 161.92458 | 15.33799 | 1.438750 | 94.99 | 0.5342 | 173.328 | 758.591 | 3.62 |
| 10 | 305.48788 | (Variable) | 1.000000 | 0.00 | 0.0000 | 171.444 | 0.000 | |
| 11 | 2127.97889 | 2.00000 | 2.003300 | 28.30 | 0.5980 | 41.805 | −43.758 | 5.23 |
| 12 | 43.34753 | 7.61590 | 1.000000 | 0.00 | 0.0000 | 37.299 | 0.000 | |
| 13 | −63.73063 | 2.00000 | 1.882997 | 40.76 | 0.5667 | 37.377 | −30.585 | 5.52 |
| 14 | 48.04261 | 10.43716 | 1.922860 | 18.90 | 0.6495 | 40.675 | 32.113 | 3.58 |
| 15 | −71.51616 | 1.37692 | 1.000000 | 0.00 | 0.0000 | 41.580 | 0.000 | |
| 16 | −57.86016 | 2.00000 | 1.882997 | 40.76 | 0.5667 | 41.614 | −63.746 | 5.52 |
| 17* | 2675.36457 | (Variable) | 1.000000 | 0.00 | 0.0000 | 43.871 | 0.000 | |
| 18 | 115.68147 | 11.91456 | 1.592010 | 67.02 | 0.5357 | 83.327 | 189.743 | 3.14 |
| 19* | −4249.04428 | 0.20000 | 1.000000 | 0.00 | 0.0000 | 83.817 | 0.000 | |
| 20 | 102.45850 | 14.24317 | 1.592010 | 67.02 | 0.5357 | 85.894 | 142.298 | 3.14 |
| 21 | −458.42946 | 0.20000 | 1.000000 | 0.00 | 0.0000 | 85.304 | 0.000 | |
| 22 | 169.80378 | 2.50000 | 1.761821 | 26.52 | 0.6135 | 82.001 | −120.969 | 3.17 |
| 23 | 59.69502 | 20.19620 | 1.438750 | 94.99 | 0.5342 | 76.595 | 119.963 | 3.62 |
| 24 | −407.62840 | 0.20000 | 1.000000 | 0.00 | 0.0000 | 75.543 | 0.000 | |
| 25* | 94.49510 | 9.35344 | 1.487490 | 70.23 | 0.5300 | 72.345 | 185.016 | 2.46 |
| 26 | −2071.02128 | (Variable) | 1.000000 | 0.00 | 0.0000 | 70.838 | 0.000 | |
| 27 | 0.00000 | 2.46203 | 1.000000 | 0.00 | 0.0000 | 32.740 | 0.000 | |
| 28 | −188.51040 | 1.40000 | 1.816000 | 46.62 | 0.5568 | 31.499 | −32.512 | 5.07 |
| 29 | 31.16209 | 0.20000 | 1.000000 | 0.00 | 0.0000 | 29.849 | 0.000 | |
| 30 | 29.69750 | 5.89566 | 1.846660 | 23.78 | 0.6205 | 30.036 | 43.892 | 3.54 |
| 31 | 129.28438 | 6.91960 | 1.000000 | 0.00 | 0.0000 | 29.161 | 0.000 | |
| 32 | −51.29675 | 1.40000 | 1.882997 | 40.76 | 0.5667 | 27.374 | −76.016 | 5.52 |
| 33 | −216.29874 | 3.13781 | 1.000000 | 0.00 | 0.0000 | 27.509 | 0.000 | |
| 34 | −58.91682 | 1.80000 | 1.754998 | 52.32 | 0.5476 | 27.465 | −44.502 | 4.40 |
| 35 | 80.06292 | 3.22776 | 1.846660 | 23.78 | 0.6205 | 28.368 | 157.066 | 3.54 |
| 36 | 194.56995 | 3.03000 | 1.000000 | 0.00 | 0.0000 | 28.775 | 0.000 | |
| 37 | 0.00000 | 17.09586 | 1.620411 | 60.29 | 0.5426 | 29.877 | 109.258 | 3.59 |
| 38 | −68.05303 | 5.63349 | 1.000000 | 0.00 | 0.0000 | 33.884 | 0.000 | |
| 39 | 1002.92254 | 6.25988 | 1.487490 | 70.23 | 0.5300 | 34.815 | 100.334 | 2.46 |
| 40 | −51.49740 | 0.20000 | 1.000000 | 0.00 | 0.0000 | 35.020 | 0.000 | |
| 41 | 3443.40036 | 1.60000 | 1.882997 | 40.76 | 0.5667 | 34.156 | −43.964 | 5.52 |
| 42 | 38.59979 | 10.23781 | 1.487490 | 70.23 | 0.5300 | 33.394 | 46.066 | 2.46 |
| 43 | −49.41848 | 0.20000 | 1.000000 | 0.00 | 0.0000 | 33.656 | 0.000 | |
| 44 | 198.28332 | 8.63335 | 1.567322 | 42.80 | 0.5730 | 32.701 | 45.062 | 2.57 |
| 45 | −29.06828 | 1.60000 | 1.882997 | 40.76 | 0.5667 | 32.010 | −31.868 | 5.52 |
| 46 | 1103.39953 | 0.20000 | 1.000000 | 0.00 | 0.0000 | 32.318 | 0.000 | |
| 47 | 62.22814 | 8.07730 | 1.487490 | 70.23 | 0.5300 | 32.577 | 55.567 | 2.46 |
| 48 | −46.20228 | 14.00000 | 1.000000 | 0.00 | 0.0000 | 32.274 | 0.000 | |
| 49 | 0.00000 | 33.00000 | 1.608590 | 46.44 | 0.5664 | 60.000 | 0.000 | 3.32 |
| 50 | 0.00000 | 13.20000 | 1.516330 | 64.15 | 0.5352 | 60.000 | 0.000 | 2.52 |
| 51 | 0.00000 | 0.00000 | 1.000000 | 0.00 | 0.0000 | 60.000 | 0.000 | |
| Image plane | ∞ | | | | | | | |

Aspherical surface data

Seventeenth surface

K = −2.53234e+004    A4 = −3.52378e−007    A6 = −2.68145e−010
A8 = 2.98079e−013

Nineteenth surface

K = 5.22565e+003    A4 = −4.50120e−008    A6 = 7.52470e−011
A8 = −5.67030e−015

Twenty-fifth surface

K = −4.90696e−002    A4 = −8.51926e−007    A6 = −6.07487e−011
A8 = −6.47986e−015

Various data
Zoom ratio 100.00

| | Wide angle | Intermediate | Telephoto |
|---|---|---|---|
| Focal Length | 9.30 | 351.12 | 930.00 |
| F number | 1.85 | 1.85 | 4.90 |
| Field angle | 30.60 | 0.90 | 0.34 |
| Image height | 5.50 | 5.50 | 5.50 |

-continued

| | | | |
|---|---|---|---|
| Total lens length | 624.67 | 624.67 | 624.67 |
| BF | 12.00 | 12.00 | 12.00 |
| d10 | 2.77 | 167.86 | 177.37 |
| d17 | 263.38 | 45.58 | 5.03 |
| d26 | 3.00 | 55.71 | 86.76 |
| d51 | 12.00 | 12.00 | 12.00 |
| Entrance pupil position | 123.30 | 2956.88 | 10484.94 |
| Exit pupil position | 435.06 | 435.06 | 435.06 |
| Front principal point position | 132.81 | 3599.42 | 13459.31 |
| Rear principal point position | 2.70 | −339.12 | −918.00 |

Zoom lens unit data

| Unit | First surface | Focal Length | Lens structure length | Front principal point position | Rear principal point position |
|---|---|---|---|---|---|
| 1 | 1 | 237.80 | 109.86 | 59.70 | −20.52 |
| 2 | 11 | −23.70 | 25.43 | 4.71 | −11.65 |
| 3 | 18 | 64.00 | 58.81 | 15.82 | −26.78 |
| 4 | 27 | 52.11 | 149.41 | 59.66 | 23.29 |

| | Wide angle | Intermediate | Telephoto |
|---|---|---|---|
| $\beta 2$ | −0.1274 | −1.1278 | −2.0589 |
| $\beta 3$ | −0.2524 | −1.0760 | −1.5611 |
| $\beta 4$ | 1.2167 | 1.2167 | 1.2167 |

TABLE 1

Table 1 Corresponding values of the respective conditional expressions in Numerical Embodiments 1 to 7

| | Conditional expression | Numerical Embodiments | | | |
|---|---|---|---|---|---|
| | | 1 | 2 | 3 | 4 |
| (1) | $(\theta pa - \theta na)/(\nu pa - \nu na)$ | $-1.57 \times 10^{-3}$ | $-1.57 \times 10^{-3}$ | $-1.57 \times 10^{-3}$ | $-1.57 \times 10^{-3}$ |
| (2) | $\nu pa - \nu na$ | 50.52 | 50.52 | 50.52 | 50.52 |
| (3) | SGa3 | 3.07 | 3.07 | 3.07 | 3.07 |
| (4) | $(\theta p - \theta n)/(\nu p - \nu n)$ | $-1.11 \times 10^{-3}$ | $-1.11 \times 10^{-3}$ | $-1.11 \times 10^{-3}$ | $-1.11 \times 10^{-3}$ |
| (5) | $(1/f3)/(1/f3p - 1/f3n)$ | 0.989 | 0.986 | 0.898 | 0.873 |
| (6) | $\phi p/3\phi$ | 1.614 | 1.618 | 1.620 | 1.606 |
| (7) | $\phi n/\phi 3$ | −0.476 | −0.471 | −0.522 | −0.477 |
| (20) | ftele/f3 | 14.53 | 15.00 | 15.00 | 16.88 |
| (21) | $f1 \cdot f3/f2^2$ | 27.1 | 27.12 | 27.04 | 28.73 |
| (22) | $|f1/f2|$ | 10.03 | 10.02 | 9.95 | 10.32 |
| (23) | ftele/f1 | 3.91 | 4.05 | 4.10 | 4.55 |
| (24) | f1/fwide | 25.57 | 24.66 | 29.3 | 26.38 |
| (34) | bd3/ea3 | 0.686 | 0.699 | 0.645 | 0.694 |

| | Conditional expression | Numerical Embodiments | | |
|---|---|---|---|---|
| | | 5 | 6 | 7 |
| (1) | $(\theta pa - \theta na)/(\nu pa - \nu na)$ | $-1.57 \times 10^{-3}$ | $-1.64 \times 10^{-3}$ | $-1.65 \times 10^{-3}$ |
| (2) | $\nu pa - \nu na$ | 50.52 | 46.59 | 48.30 |
| (3) | SGa3 | 3.07 | 2.98 | 3.11 |
| (4) | $(\theta p - \theta n)/(\nu p - \nu n)$ | $-1.11 \times 10^{-3}$ | $-1.13 \times 10^{-3}$ | $-1.16 \times 10^{-3}$ |
| (5) | $(1/f3)/(1/f3p - 1/f3n)$ | 1.062 | 0.911 | 0.941 |
| (6) | $\phi p/3\phi$ | 1.609 | 1.685 | 1.666 |
| (7) | $\phi n/\phi 3$ | −0.492 | −0.541 | −0.529 |
| (20) | ftele/f3 | 14.53 | 14.53 | 14.53 |
| (21) | $f1 \cdot f3/f2^2$ | 27.1 | 27.1 | 27.1 |
| (22) | $|f1/f2|$ | 10.03 | 10.03 | 10.03 |
| (23) | ftele/f1 | 3.91 | 3.91 | 3.91 |
| (24) | f1/fwide | 25.57 | 25.57 | 25.57 |
| (34) | bd3/ea3 | 0.697 | 0.703 | 0.685 |

According to the embodiments describe above, a zoom lens system may be provided in which chromatic aberrations are excellently corrected over the entire zoom range between the wide angle end and the telephoto end at a high zoom ratio to obtain high optical performance over the entire zoom range. An image pickup apparatus including the zoom lens system may be also provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188461, filed Aug. 17, 2009, which is hereby incorporated by reference herein in its entirety.

What is claimed is:

1. A zoom lens system, comprising, in order of from an object side to an image side:
    a first lens unit which does not move for zooming and has a positive refractive power;
    a second lens unit which moves for zooming and has a negative refractive power;
    a third lens unit which moves for zooming and has a positive refractive power; and
    a fourth lens unit which does not move for zooming, is provided for imaging, and has a positive refractive power, wherein:
    the third lens unit includes a positive lens and a negative lens; and
    the following conditions are satisfied:

$-2.0 \times 10^{-3} < (\theta pa - \theta na)/(\nu pa - \nu na) < -1.4 \times 10^{-3}$;

$41 < \nu pa - \nu na < 53$; and $2.9 < SGa3 < 3.2$, where νna and θna indicate an average of Abbe numbers and an average of partial dispersion ratios, respectively, of materials of the negative lenses included in the third lens unit in case where the third lens unit includes a plurality of negative lenses or an Abbe number and a partial dispersion ratio, respectively, of a material of the negative lens included in the third lens unit in case where the third lens unit includes one negative lens, νpa and θpa indicate an average Abbe number and an average partial dispersion ratio, respectively, of a material of the positive lens included in the third lens unit in case where the third lens unit includes a plurality of positive lenses or an Abbe number and a partial dispersion ratio, respectively, of a material of the positive lens included in the third lens unit in case where the third lens unit includes one positive lens, SGa3 indicates an average specific gravity of the multiple lenses included in the third lens unit, and partial dispersion ratio θ is represented by θ=(Ng−NF)/(NF−NC) where Ng, NF, and NC represent refractive indices with respect to g-line, F-line, and C-line, respectively.

2. A zoom lens system according to claim 1, wherein the third lens unit comprises four positive lenses and one negative lens.

3. A zoom lens system according to claim 1, wherein the following conditions are satisfied:

$-1.2 \times 10^{-3} < (\theta p - \theta n)/(\nu p - \nu n) < -1.1 \times 10^{-3}$; and $0.8 < (1/f3)/(1/f3p - 1/f3n) < 1.1$, where f3n, νn, and θn indicate a focal length, an Abbe number, and a partial dispersion ratio, respectively, of a negative lens containing a material having a smallest Abbe number, of the multiple lenses included in the third lens unit, f3p, νp, and θp indicate a focal length, an Abbe number, and a partial dispersion ratio, respectively, of a positive lens containing a material having a largest Abbe number, of the multiple lenses included in the third lens unit, and f3 indicates a focal length of the third lens unit.

4. A zoom lens system according to claim 1, wherein the following conditions are satisfied:

$1.6 < \phi p/\phi 3 < 1.7$; and $-0.6 < \phi n/\phi 3 < -0.4$, where φp indicates a sum of refractive power of the positive lens included in the third lens unit, φn indicates a sum of refractive power of the negative lens included in the third lens unit, and φ3 indicates a refractive power of the third lens unit.

5. A zoom lens system according to claim 1, wherein a material of at least one positive lens included in the third lens unit satisfies the following conditions:

$60 < \nu 3_{p1} < 75$;

$0.53 < \theta 3_{p1} < 0.54$;

$1.55 < N3_{p1} < 1.65$; and $3.0 < SG3_{p1} < 3.2$, where $\nu 3_{p1}$, $\theta 3_{p1}$, $N3_{p1}$, and $SG3_{p1}$ indicate an Abbe number, a partial dispersion ratio, a refractive index, and a specific gravity, respectively, of the material.

6. A zoom lens system according to claim 1, wherein a material of at least one positive lens included in the third lens unit satisfies the following conditions:

$60 < \nu 3_{p2} < 75$;

$0.53 < \theta 3_{p2} < 0.54$;

$1.45 < N3_{p2} < 1.55$; and $2.4 < SG3_{p2} < 2.6$, where $\nu 3_{p2}$, $\theta 3_{p2}$, $N3_{p2}$, and $SG3_{p2}$ indicate an Abbe number, a partial dispersion ratio, a refractive index, and a specific gravity, respectively, of the material.

7. A zoom lens system according to claim 1, wherein a material of a negative lens included in the third lens unit satisfies the following conditions:

$20 < \nu 3_{n1} < 28$;

$0.6 < \theta 3_{n1} < 0.615$;

$1.7 < N3_{n1} < 2.0$; and $3.0 < SG3_{n1} < 3.7$, where $\nu 3_{n1}$, $\theta 3_{n1}$, $N3_{n1}$, and $SG3_{n1}$ indicate an Abbe number, a partial dispersion ratio, a refractive index, and a specific gravity, respectively, of the material.

8. A zoom lens system according to claim 1, wherein the following condition is satisfied:

$14.5 < ftele/f3 < 17.0$, where f3 indicates a focal length of the third lens unit and ftele indicates a focal length of the zoom lens system at a telephoto end.

9. A zoom lens system according to claim 1, wherein the following condition is satisfied:

$27 < f1 \times f3/f2^2 < 29$, where f1 indicates a focal length of the first lens unit and f2 indicates a focal length of the second lens unit.

10. A zoom lens system according to claim 1, wherein the following condition is satisfied:

$$9.5<|f1/f2|<11,$$

where f1 indicates a focal length of the first lens unit and f2 indicates a focal length of the second lens unit.

11. A zoom lens system according to claim 1, wherein the following condition is satisfied:

$$3.9<ftele/f1<6,$$

where f1 indicates a focal length of the first lens unit and ftele indicates a focal length of the zoom lens system at a telephoto end.

12. A zoom lens system according to claim 1, wherein the following condition is satisfied:

$$24<f1/fwide<30,$$

where f1 indicates a focal length of the first lens unit and fwide indicates a focal length of the zoom lens system at a wide angle end.

13. A zoom lens system according to claim 1, wherein the third lens unit comprises, in order of from the object side to the image side:
 a first biconvex positive lens;
 a second biconvex positive lens;
 a negative meniscus lens having a convex surface facing toward the object side;
 a third positive lens having a convex surface facing toward the object side; and
 a fourth positive lens having a convex surface facing toward the object side.

14. A zoom lens system according to claim 1, wherein the third lens unit comprises, in order of from the object side to the image side:
 a first biconvex positive lens;
 a second biconvex positive lens;
 a third biconvex positive lens;
 a negative lens having a concave surface facing toward the object side; and
 a fourth positive lens having a convex surface facing toward the object side.

15. An image pickup apparatus, comprising:
 a zoom lens system; and
 a solid state image pickup element for receiving an image formed by the zoom lens system, wherein:
 the zoom lens system includes, in order of from an object side to an image side:
  a first lens unit which does not move for zooming and has a positive refractive power;
  a second lens unit which moves for zooming and has a negative refractive power;
  a third lens unit which moves for zooming and has a positive refractive power; and
  a fourth lens unit which does not move for zooming, is provided for imaging, and has a positive refractive power;
 the third lens unit includes a positive lens and a negative lens; and
 the following conditions are satisfied:

$$2.0\times10^{-3}<(\theta pa-\theta na)/(\nu pa-\nu na)<-1.4\times10^{-3};$$

$$41<\nu pa-\nu na<53; \text{ and}$$

$$2.9<SGa3<3.2,$$

where $\nu na$ and $\theta na$ indicate an average of Abbe numbers and an average of partial dispersion ratios, respectively, of materials of the negative lenses included in the third lens unit in case where the third lens unit includes a plurality of negative lenses or an Abbe number and a partial dispersion ratio, respectively, of a material of the negative lens included in the third lens unit in case where the third lens unit includes one negative lens, $\nu pa$ and $\theta pa$ indicate an average of Abbe numbers and an average of partial dispersion ratios, respectively, of materials of the positive lenses included in the third lens unit in case where the third lens unit includes a plurality of positive lenses or an Abbe number and a partial dispersion ratio, respectively, of a material of the positive lens included in the third lens unit in case where the third lens unit includes one positive lens, and SGa3 indicates an average specific gravity of the multiple lenses included in the third lens unit, and partial dispersion ratio $\theta$ is represented by $\theta=(Ng-NF)/(NF-NC)$ where Ng, NF, and NC represent refractive indices with respect to g-line, F-line, and C-line, respectively.

* * * * *